US012669081B1

(12) United States Patent
Andrews

(10) Patent No.: US 12,669,081 B1
(45) Date of Patent: Jun. 30, 2026

(54) LAMINATED UNIVERSAL EFFORT MACHINE

(71) Applicant: Timothy Wayne Andrews, Chula Vista, CA (US)

(72) Inventor: Timothy Wayne Andrews, Chula Vista, CA (US)

( * ) Notice: Subject to any disclaimer, the term of this patent is extended or adjusted under 35 U.S.C. 154(b) by 0 days.

(21) Appl. No.: 19/319,822

(22) Filed: Sep. 5, 2025

Related U.S. Application Data

(60) Provisional application No. 63/791,682, filed on Apr. 20, 2025.

(51) Int. Cl.
*F02B 75/32* (2006.01)
*F02B 53/06* (2006.01)
*F02B 53/10* (2006.01)
*F02B 53/12* (2006.01)
*F02B 55/14* (2006.01)

(52) U.S. Cl.
CPC .............. *F02B 75/32* (2013.01); *F02B 53/06* (2013.01); *F02B 53/10* (2013.01); *F02B 53/12* (2013.01); *F02B 55/14* (2013.01)

(58) Field of Classification Search
CPC .......... F02B 75/32; F02B 53/00; F02B 53/06; F02B 53/10; F02B 53/12; F02B 55/02; F02B 55/08; F02B 55/14; F02B 55/16; F02B 2730/00; F02B 2730/01; F02B 2730/017; F01C 1/084; F01C 1/103; F01C 11/004; F04C 2250/101; F04C 2250/102
See application file for complete search history.

(56) References Cited

U.S. PATENT DOCUMENTS 1,688,816 A * 10/1928 Kraus ..................... F02B 53/00 123/238
2,058,817 A * 10/1936 Northey .................. F02B 53/00 123/214
3,117,562 A * 1/1964 Hajet ........................ F01C 1/20 418/191
7,341,042 B1 * 3/2008 Chung .................... F01C 1/123 123/238

* cited by examiner

*Primary Examiner* — Loren C Edwards
(74) *Attorney, Agent, or Firm* — Michael D. Eisenberg

(57) ABSTRACT

An effort machine comprising a pair of shafts, an energy conversion unit traversed by the shafts, and a timing apparatus. The energy conversion unit includes an inlet, an outlet, a first disc joined to the first shaft to rotate in a first direction with the first shaft, a second disc joined to the first shaft to rotate in a second direction opposite the first direction with the second shaft. The timing apparatus is coupled to the shafts to maintain rotation of the first disc and the second disc at a same rotational speed in opposite directions. The discs are configured to interact with a fluid such that: pressure by the fluid onto the first disc causes rotation of the discs; and/or rotation of at least one of the first shaft and the second shaft causes the fluid to be pumped through energy conversion unit, from the inlet to the outlet.

20 Claims, 23 Drawing Sheets

LAMINATED UNIVERSAL EFFORT MACHINE

CROSS-REFERENCE TO RELATED APPLICATIONS

This application claims priority from U.S. Provisional Application Ser. No. 63/791,682 filed on Apr. 20, 2025, which is hereby incorporated herein by reference in its entirety.

TECHNICAL FIELD

This invention relates to devices for conversion of energy, such as in engines, motors, generators and pumps.

BACKGROUND OF THE INVENTION

Common piston powered engines include a piston that is caused to move along a single axis and change direction a few times during an operational cycle of the engine. For example, a common internal combustion engine has four parts for ignition cycle: 1) intake, 2) compression, 3) expansion (power), 4) exhaust. During intake the piston moves in a first direction to expand the volume in the cylinder. During compression, the piston is moved in a second direction (opposite to the first direction) to compress the gas in the cylinder. During expansion, the ignition of the fuel in the cylinder causes high pressure buildup, which moves the piston to move again in the first direction. During exhaust, the piston moves in the second direction to push the combustion product out of the cylinder. Therefore, a single ignition cycle requires two to four changes of piston mass momentum direction per cycle. The changes in direction of momentum reduce the efficiency of the engine.

Moreover, conversion of the piston's movement to useable power (for engines, motors, vehicles, pumps, etc.) requires numerous moving components-such as pistons, rings, connecting rods, cam shafts, crank shaft, lifter's, push rods, etc. This adds to the complexity of the engines and further decreases efficiency.

BRIEF SUMMARY OF EMBODIMENTS OF THE INVENTION

The present invention aims to provide an effort machine useable as a power conversion system that does not necessitate numerous changes in direction and momentum and does not require additional complex components for converting linear motion to rotational motion. The invention preserves "Conservation of Momentum". The effort machine may be used to convert a first form of energy (thermal, hydraulics, combustion, pneumatic) directly into rotational energy, without the need for additional, various complex components. The rotational energy may be used to power a motor, generate electricity, etc. The effort machine may also convert externally-provided rotational energy into mechanical energy to drive a fluid (liquid or gas) in a desired direction.

The invention performs energy input and output variants in a useful manner with mechanical simplicity. The base invention performs work variants and conversion with as little as only two moving assemblies. True balanced rotational functionality is configurable as desired. The present invention may incorporate any variants as needed, to be used as a motor, engine, generator, or pump. Comprised, built up of thin plates, panels, sheets and discs s cut to shape, stacked up, and otherwise layered together. The effort machine may include as many layers as desired with various functionalities per layer set, such as in engines, motors, generators, and pumps. With as little as a two rotational part moving assemblies, the present invention has unique, mechanical makeup, geometry, and novel embodiments that are potentially useful.

Therefore, an aspect of some embodiments of the present invention relates to 1. An effort machine, comprising: i. a first shaft; ii. a second shaft; iii. a power disc joined to the first shaft to rotate with the first shaft, the power disc having a first circumference and a moment beam extending radially from a portion of the first circumference; iv. a gate disc joined to the second shaft to rotate with the second shaft, the gate disc having a perimeter that comprises a partial circumference and an indentation, the partial circumference extending from a first end to a second end and the indentation extending inward between the first end and the second end opposite the partial circumference; v. a timing apparatus coupled to the first shaft and to the second shaft and configured to control a rotation of the gate disc and the power disc, such that at a first rotational range the first circumference contacts the partial circumference, and at a second rotational range the moment beam is contained within the indentation; vi. a compression plate, having an inlet, an outlet, and a cavity, the cavity being configured for holding the power disc and the gate disc, the cavity being bounded by a first curved wall centered about the first shaft and having a first end and a second end and a second curved wall centered about the second shaft and meeting the first curved wall at the first end and at the second end; vii. a lower panel below the compression plate and configured to close the cavity from below; viii. an upper panel above the compression plate and configured to close the cavity from above. The first curved wall is configured such that the moment beam is flush with the first curved wall in the first rotational range, wherein the lower panel is flush with bottom surfaces of power disc and the gate disk, and wherein the upper panel is flush with top surfaces of the power disc and the gate disk. The inlet opens into the cavity at a first position on the first curved wall for guiding a fluid from outside the compression plate into the cavity. The outlet opens into the cavity at a second position on the first curved wall for guiding the fluid from the cavity outside the compression plate.

In a variant, the first position is on the first wall, in a vicinity of the first end, while the second position is on the first wall, in a vicinity of the second end.

In another variant, the timing apparatus comprises: a first gear joined to the first shaft to rotate with the first shaft; and a second gear meshed with the first gear, the second gear being joined to the second shaft to rotate with the second shaft. The first gear and the second gear are located outside the compression plate, beyond the lower panel or beyond the upper panel.

In yet another variant: the lower panel has a first opening configured to be traversed by the first shaft and a second opening configured to be traversed by the second shaft, the effort machine comprises a first bearing and second bearing covering the first opening and the second opening, respectively, the first bearing being configured to couple to the first shaft and the second bearing being configured to couple to second shaft, to enable rotation of the first shaft and the second shaft while preventing flow of the fluid out of the cavity of the compression plate via the lower panel; and/or the upper panel has a third opening configured to be traversed by the first shaft and a fourth opening configured to be traversed by the second shaft, while the effort machine comprises a third bearing and a fourth bearing covering the third opening and the fourth opening, respectively, the third bearing being configured to couple to the first shaft and the fourth bearing being configured to couple to second shaft, to enable rotation of the first shaft and the second shaft while preventing flow of the fluid out of the cavity of the compression plate via the upper panel.

In a further variant, the fluid entering the cavity via the inlet comprises a flammable fluid; the compression plate comprises an ignition port located on the first curved wall in a vicinity of inlet, the ignition port comprising an ignition device configured to ignite the flammable fluid located between the moment beam of the power disc and the partial circumference of the gate disc in the first rotational range, once the inlet and the ignition port are cleared by the moment beam.

In yet a further variant, the effort machine incudes a one-way valve at the inlet to prevent flow of the fluid out of the cavity via the inlet.

In some embodiments of the present invention, the effort machine comprises at least one second compression plate having a second cavity containing a second power disc and a second gate disk, wherein. The second compression plate is stackable onto the compression plate on top of the upper panel, such that the second power disc is joined to the first shaft to rotate with the first shaft and the second gate disc is joined to the second shaft to rotate with the second shaft. The second cavity is bounded by a third curved wall centered about the first shaft and having a third end and a fourth end, and a fourth curved wall centered about the second shaft and meeting the first curved wall at the first end and at the second end. The second power disc has a second circumference and a second moment beam extending radially from a portion of the second circumference. The second gate disc has a second perimeter that comprises a second partial circumference and a second indentation, the second partial circumference extending from a third end to a fourth end and the second indentation extending inward between the third end and the fourth end opposite the second partial circumference. At a third rotational range the second circumference of the second power disc contacts the second partial circumference of the second gate disc, and at a fourth rotational range the second moment beam is contained within the second indentation.

In a variant, the third rotational range corresponds to the first rotational range, while the fourth rotational range corresponds the second rotational range.

In another variant, the third rotational range is offset with respect to the first rotational range, while the fourth rotational range is offset with respect to the second rotational range.

In yet another variant, the second compression plate has: a second inlet which opens into the second cavity at a third position on the third curved wall for guiding a fluid from outside the compression plate into the cavity; and a second outlet opening into the second cavity at a fourth position on the third curved wall for guiding the fluid from the cavity outside the compression plate.

In a further variant: the second compression plate has a second inlet which opens into the second cavity at a third position on the third curved wall for guiding a fluid from outside the compression plate into the cavity. The upper panel between the compression plate and the second compression plate has a channel having a first end opening under the second power disc and second end opening above the cavity of the first compression plate. The second power disc has a notch located on the bottom of the second power disc, downstream of second moment arm, and conforming to the first end of the channel, such that when the notch aligns with the first end of the channel, compressed fluid flows into the channel from the second cavity of the second compression plate to the cavity of the compression plate.

In yet another variant, the second end of the channel opens in a vicinity of the first end of the first wall.

In some embodiments of the present invention, the effort machine further includes a third shaft and a second power disc, which is joined to the third shaft to rotate with the third shaft, the second power disc having a second circumference and a second moment beam extending radially from a portion of the second circumference. The compression plate comprises a third curved wall centered about the third shaft and having a third end and fourth end, the third curved wall meeting the second curved wall at the third end and the fourth end, such that the cavity is bounded by the first wall, the second wall, and the fourth wall. The timing apparatus is coupled to the first shaft, the second shaft, and the third shaft, such that the first rotational range comprises a first subrange, a second subrange, and a third subrange. In the first subrange of the first rotational range, the first circumference of the first power disc contacts the partial circumference of the gate disc, while the second circumference of the second power disc contacts the partial circumference of the gate disc. In the second subrange of the first rotational range, the second moment beam of the second power disc is contained within the indentation of the gate disc. In the third subrange of the first rotational range, the first circumference of the first power disc contacts the partial circumference of the gate disc, while the second circumference of the second power disc contacts the partial circumference of the gate disc. In the second rotational range, the first moment beam of the first power disc is contained within the indentation of the gate disc.

In a variant, the timing apparatus includes: a first gear joined to the first shaft to rotate with the first shaft; a second gear meshed with the first gear, the second gear being joined to the second shaft to rotate with the second shaft; a third gear meshed with the second gear, the third gear being joined to the third shaft to rotate with the third shaft. The first gear, the second gear, and the third gear are located outside the compression plate, beyond the lower panel or beyond the upper panel.

In some embodiments of the present invention, the effort machine includes a magnetic rotor which comprises an electrical coil and a rotating element having magnets disposed thereupon. The rotating element is joined to at least one of the first shaft and the second shaft to rotate coaxially with the at least one of the first shaft and the second shaft.

In a variant, the magnetic rotor is configured to be used as generator, by converting rotation of the at least one of the first shaft and the second shaft into rotation of the rotating element, and into electrical current passing through the coils due rotation of magnets in the rotating element.

In another variant, the magnetic rotor is configured used as a motor, by converting electrical current passing through the coils into rotation of the rotating element, and to rotation of the at least one of the first shaft and the second shaft joined to the rotating element.

In some embodiments of the present invention, the at least one of the upper panel and the lower panel comprises: a circulation subpanel comprising an input port for receiving a lubricant or a coolant, a groove for circulating the lubricant or the coolant along the circulation subpanel, and an output port for discharging the lubricant or the coolant; at least one cover subpanel to close the groove.

In some embodiments of the present invention, the effort machine includes a detection system configured to detect a position of the moment beam and of the indentation.

Another aspect of some embodiments of the present invention relates to an effort machine, comprising: i. a first shaft; ii. a second shaft; iii. a power disc joined to the first shaft to rotate with the first shaft, the power disc having a first circumference, a first moment beam extending radially from a first portion of the first circumference, and a second moment beam extending radially from a second portion of the first circumference opposite to the first portion; iv. a gate disc joined to the second shaft to rotate with the second shaft, the gate disc having a perimeter that comprises a first partial circumference, a first indentation, a second partial circumference, and a second indentation, such each of the partial circumferences is adjacent to the first indentation and the second indentation, while being opposite to each other; v. a timing apparatus coupled to the first shaft and to the second shaft and configured to control a rotation of the gate disc and the power disc, such that at a first rotational range the first moment beam is contained in the first indentation, at a second rotational range the first circumference contacts the first partial circumference, at a third rotational range the second moment beam is contained in the second indentation and at fourth rotational range, the first circumference contacts the second partial circumference; vi. a compression plate, having an inlet, an outlet, and a cavity, the cavity being configured for holding the power disc and the gate disc, the cavity being bounded by a first curved wall centered about the first shaft and having a first end and a second end, and a second curved wall centered about the second shaft and meeting the first curved wall at the first end and at the second end; vii. a lower panel below the compression plate and configured to close the cavity from below; viii. an upper panel above the compression plate and configured to close the cavity from above. The first curved wall is configured such that the first moment beam and the second moment beam are flush with the first curved wall when not in respective ones of the first indentation and the second indentation, wherein the lower panel is flush with bottom surfaces of power disc and the gate disk, and wherein the upper panel is flush with top surfaces of the power disc and the gate disk. The inlet opens into the cavity at a first position on the first curved wall for guiding a fluid from outside the compression plate into the cavity. The outlet opens into the cavity at a second position on the first curved wall for guiding the fluid from the cavity outside the compression plate.

Another aspect of some embodiments of the present invention relates to an effort machine comprising a pair of shafts, an energy conversion unit traversed by the shafts, and a timing apparatus. The energy conversion unit includes an inlet, an outlet. a first disc joined to the first shaft to rotate in a first direction with the first shaft. a second disc joined to the first shaft to rotate in a second direction opposite the first direction with the second shaft. The timing apparatus is coupled to the shafts to maintain rotation of the first disc and the second disc at a same rotational speed in opposite directions. The discs are configured to interact with a fluid such that: pressure by the fluid onto the first disc causes rotation of the discs; and/or rotation of at least one of the first shaft and the second shaft causes the fluid to be pumped through energy conversion unit, from the inlet to the outlet.

In a variant, the effort machine includes a plurality of energy conversion units are mounted onto the first shaft and the second shaft.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
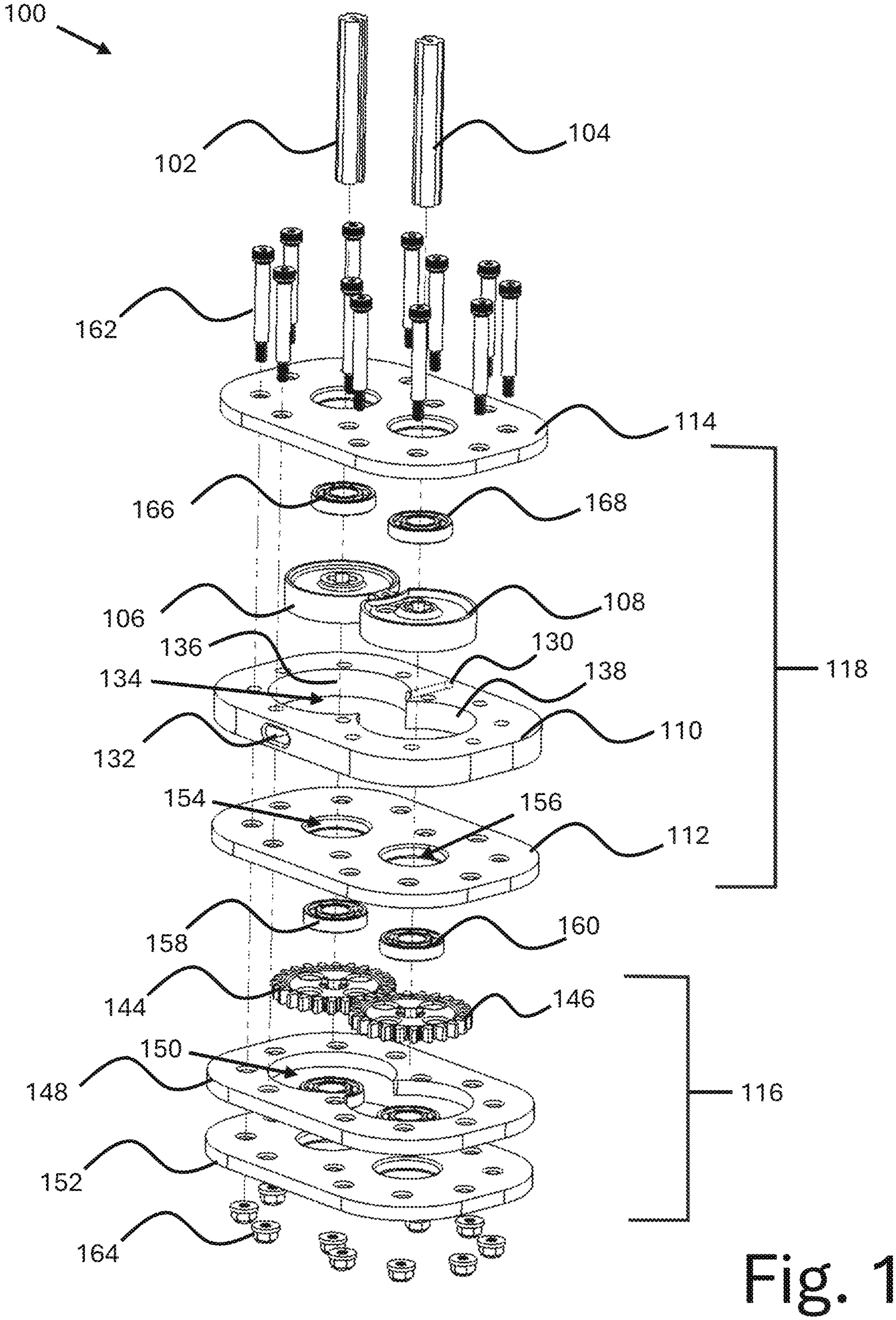
FIG. 1 illustrates an exploded view of an effort machine, according to some embodiments of the present invention.

Referring now to the drawings, FIG. 1 illustrates an exploded view of an effort machine 100, according to some embodiments of the present invention.

The effort machine 100 of the present invention includes a first shaft 102, a second shaft 104, an energy conversion unit 118 and a timing apparatus 116. The energy conversion unit 118 has an inlet 130 and an outlet 132. The inlet is configured to enable entry of a fluid into the energy conversion unit. The outlet is configured to enable exit of the fluid from the energy conversion unit. Rotatable discs 106 and 108 are inside the energy conversion unit 118 and are linked to the first shaft 102 and the second shaft 104, respectively. The rotating discs are designed to interact with each other to rotate in concert (at the same rotational speed) and in opposing directions. This is ensured by the timing apparatus that is connected to the shafts. The rotating discs are designed to interact with the fluid, in order to: (1) convert flow of a pressurized fluid entering through the inlet 130 and exiting through the outlet 132 into rotation of the discs 106 and 108, causing rotation of the shafts 102 and 104; (2) contain an exothermal reaction (such as a combustion) between at least two reagents, which raises pressure inside the energy conversion unit, to cause rotation of the discs 106 and 108, causing rotation of the shafts 102 and 104: (3) convert a rotation of the shafts 102 and 104 into an interaction with the fluid, which drives a fluid from the inlet into the energy conversion unit 118 and releases the fluid drawn out of the energy conversion unit 118 via the outlet. In configurations (1) and (2), the effort machine 100 is configured to be used as motor, generator, or engine. In configuration (3), the effort machine is configured to be used as a pump.

The advantage of the effort machine of the present invention is the fact that the energy conversions of configurations (1), (2), (3) directly results in the rotations of the shaft or is a direct result of the rotation of the shafts. Therefore, contrary to the general art, no additional parts are necessary for conversion of rotational energy to linear energy. Moreover, a plurality of energy conversion units 118 may be stackable in the effort machine 100 and mountable onto the shaft 102 and 104, to provide customization of the effort machine to satisfy a user's need.

A power disc 106, a gate cam disc 108 (also referred to herein as "gate disc 108"), a compression plate 110, and at least one of a lower panel 112 and an upper panel 114 may form together the energy conversion unit 118 of the effort machine 100, as will be explained further below.

Figure 10:
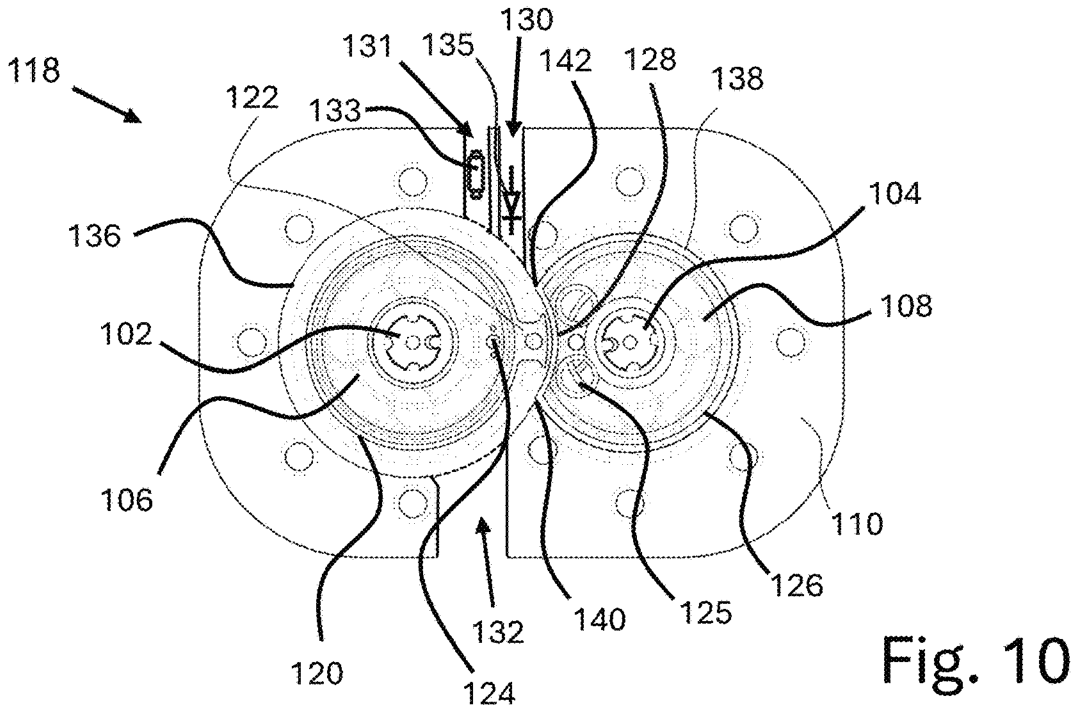
FIG. 10 is a top-down cross-sectional view of a compression plate with a power disc and a gate disc, according to some embodiments of the present invention.

FIG. 10 is a top down cross-sectional view of the energy conversion unit 118, which includes the compression plate 110, power disc 106 and a gate cam disc 108, according to some embodiments of the present invention.

The power disc 106 is joined to the first shaft 102 to rotate coaxially with the first shaft 102. The power disc has a first circular circumference 120 and a moment beam 122 extending radially from a portion of the first circumference. The power disc may also have one or more holes 124 extending parallel to the central axis of the power disc's first circular circumference, to balance the weight of the power disc and decrease vibrations during the rotation of the power disc. In some embodiments of the present invention, the power disc 106 has a central hole configured to be traversed by the first shaft 102 and shaped to match the keyed shape of top cross-section of the first shaft 102, such that the first shaft and the power disc rotate coaxially together when joined to each other.

The gate disc 108 is joined to the second shaft 104 to rotate coaxially with the second shaft 104. The gate cam disc 108 has a perimeter that includes a partial circular circumference 126 and a cutout or indentation 128. The partial circular circumference 126 is an arc of a circle centered about a central axis (which corresponds to the axis of the second shaft 104 when the shaft and the gate cam disc are joined) and extending from a first end to a second end. The indentation 128 extends inward between the first end and the second end opposite the partial circumference. The power disc may have one or more holes 125 extending parallel to the central axis of the power disc's first circular circumference, to balance the weight of the power disc and decrease vibrations during the rotation of the power disc In some embodiments of the present invention, the gate disc 108 has a central hole configured to be traversed by the second shaft 104 and shaped to match the keyed shape of top cross-section of the second shaft 104, such that the second shaft and the gate disc rotate coaxially together when joined to each other.

The compression plate 110 has an inlet 130, an outlet 132, and a cavity 134. The cavity 134 is shaped for holding the power disc 106 and the gate cam disc 108. The cavity chamber being bound by a first curved wall 136 and a second curved wall 138. The first curved wall 136 has a profile of a circular arc centered about the first shaft and having a first end 140 and a second end 142.

The second curved wall 138 has a profile of a circular arc centered about the second shaft and meeting the first curved wall 136 at the first end 140 and at the second end 142.

Referring back to FIG. 1, the lower panel 112 is located below the compression plate 110 and is configured to close the cavity 134 from below. The upper panel 114 is located above the compression plate 110 and is configured to close the cavity 134 from above.

The first curved wall 136 is configured such that the moment beam 122 is flush with the first curved wall in a first rotational range. The lower panel 112 is flush with bottom surfaces of power disc 106 and the gate disk 108. The upper panel 114 is flush with top surfaces of the power disc 106 and the gate disk 108. The inlet 130 opens into the cavity 134 at a first position on the first curved wall 136 for guiding a fluid (in the form of a liquid, and/or gas, and/or vapor) from outside the compression plate into the cavity 134. The outlet 140 opens into the cavity 134 at a second position on the first curved wall 136 for guiding the fluid from the cavity 134 to the outside of the compression plate. In some embodiments of the present invention, the first position is on the first wall 136 in a vicinity of the first end 140, while the second position is on the first wall 136, in a vicinity of the second end 142.

In some embodiments of the present invention the effort machine 100 includes a one-way valve 135 at the inlet to prevent pressurized flow of fluid (in gaseous and/or liquid form) out of the cavity via the inlet.

In some embodiments of the present invention, the compression plate 110 includes an ignition port 131 having an opening on the first curved wall 136 in a vicinity of inlet 130. The ignition port comprising an ignition device 133 (such as a spark plug, or an igniter, for example) configured to ignite a flammable vapor located between the moment beam 122 of the power disc 106 and the partial circumference of the gate cam disc 108 in the first rotational range, once the inlet and 130 the ignition port 131 are cleared by the moment beam 122.

Going back to FIG. 1, the timing apparatus 116 is coupled to the first shaft 102 and to the second shaft 104. The timing apparatus is configured to control a rotation of the gate cam disc 108 and the power disc 106, and ensure that the gate cam disc 108 and the power disc 106 rotate in concert in opposite directions and at the same rotational speed. In this manner, at a first rotational range the first circumference 120 of the power disc 106 contacts the partial circumference 126 of the gate disc 108 (while the moment beam 120 is flush with the first wall 136, while at a second rotational range the moment beam 120 does not contact the first wall 138 and is contained within the indentation 128 of the gate disc 108.

The timing apparatus may include gears, belts or chains, configured to ensure that the shafts rotate in concert, in opposite directions and at the same rotational speed.

In some embodiments of the present invention, the timing apparatus 116 includes a first gear 144 and a second gear 146. The first gear 144 is joined to the first shaft 102 to rotate coaxially with the first shaft 102. The second gear 146 is meshed with the first gear 144, and is joined to the second shaft 104 to rotate coaxially with the second shaft 104. The first gear 144 and the second gear 146 are located outside the compression plate 110, beyond the lower panel 112 or beyond the upper panel 114. In the example of FIG. 1, the gears are below the lower panel 112. However, the effort machine of the present invention may be modular and can be constructed in different manners, such that, where illustrations indicate a single gear layer set, a plurality of gear layer sets may be present for redundancy and/or for mechanical balance strain relief. Alternatively or additionally, the gears may be above the upper panel 114.

In some embodiments of the present invention, the timing apparatus 116 includes a gear plate 148 having a cavity 150 for housing the gears 144 and 146 in a manner that allows the gears to be meshed with each other, such that the first gear 144 is traversed by the first shaft 102 and the second gear is traversed by the second shaft 104. An end panel 152 may be included in the timing apparatus to close the gear plate from below (or from above, if the gears are above the upper plate) to ensure that the gears remain in place in the gear panel 148.

At least one of the panels (lower panel 112, upper panel 114, end panel 152) may include the following: a first opening configured 154 to be traversed by the first shaft 102 and a second opening 156 configured to be traversed by the second shaft 104. Each opening has a respective bearing. For example, a first bearing 158 and second bearing 160 cover the first opening 154 and the second opening 156, respectively. The first bearing 158 is configured to be traversed by and coupled to the first shaft 102, while the second bearing 160 is configured to be traversed by and coupled to second shaft 104, to enable rotation of the first shaft and the second shaft. For the upper and lower panel, the bearings are configured to prevent flow of the fluid out of the cavity 134 of the compression plate 110 via the upper and lower panel, as gaskets or other sealing units may be placed in the central hole of the bearings (between each bearing and the respective shaft traversing the bearing).

In some embodiments of the present invention, the different panels and plates of the effort machine 100 (compression plate 110, lower panel 112, upper panel 114, gear plate 148, end plate 150, and any other similar devices) have openings that align with each other and are sized to be traversed by fasteners for joining the panels and plates together to form the effort machine. Examples of fasteners include, for example, bolts 162 and nuts 164. Other types of fasteners may include fasteners may include screws, pins, and pegs. The scope of the invention is not limited the fasteners listed above, and extends to any type of fastener that keeps two elements together including weldments and adhesives.

FIGS. 2-7 illustrate steps of the layer-by layer construction of an effort machine according to some embodiments of the present invention.

The effort machine of the present invention may be modular, enabling a user to construct an effort machine by putting together the different elements of the effort machine in any desired order. FIGS. 2-7 are merely examples of a non-limiting method for putting together an effort machine of the present invention.

Figure 2:
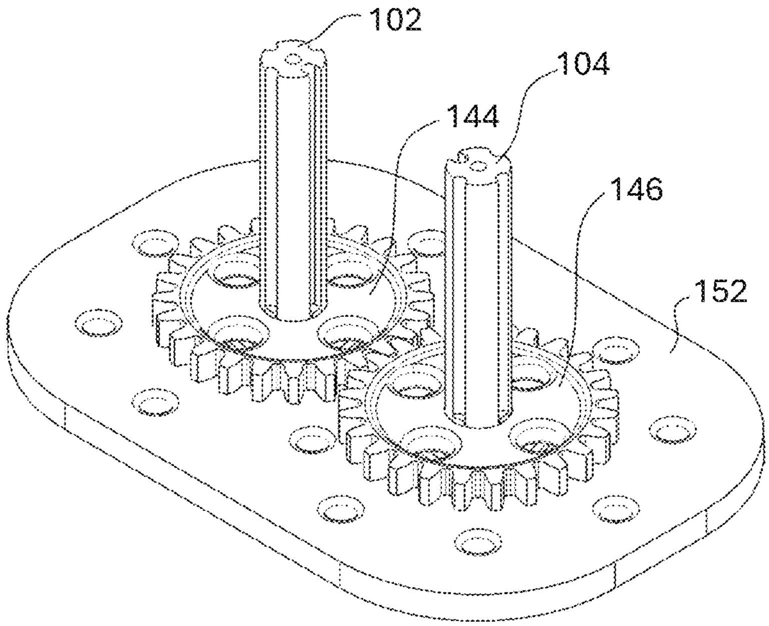
FIGS. 2-7 illustrate steps of the layer-by layer construction of an effort machine according to some embodiments of the present invention.
Figure 3:
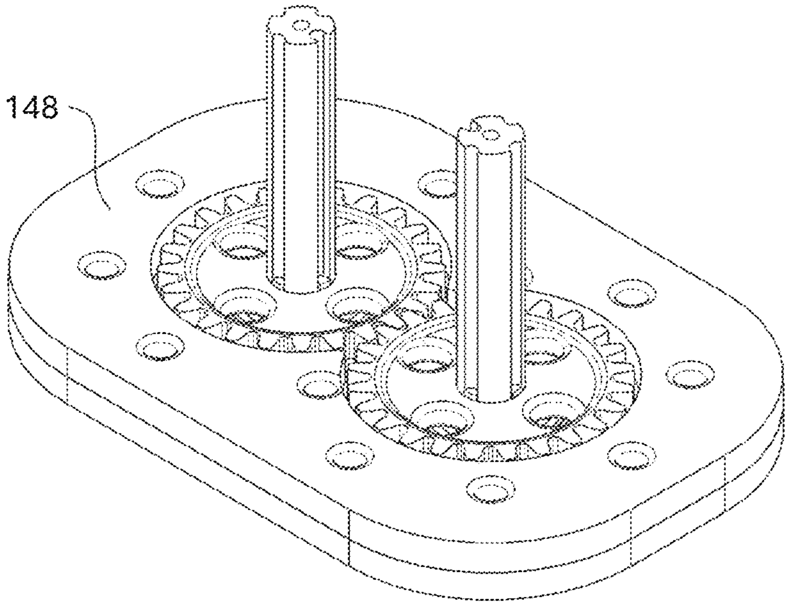

In FIG. 2, the end panel 152 is provided. The first gear 144 is joined to the first shaft 102 and the second gear 146 is joined to the second shaft 104 (note the keyed connection between each gear and its respective shaft, that causes each gear to rotate coaxially with the respective shaft). The gears are placed on the end panel 152 to be meshed with each other. In FIG. 3, the gear plate 148 is stacked on the end panel, to keep the gears in place and ensure the gears remain meshed with each other.

Figure 4:
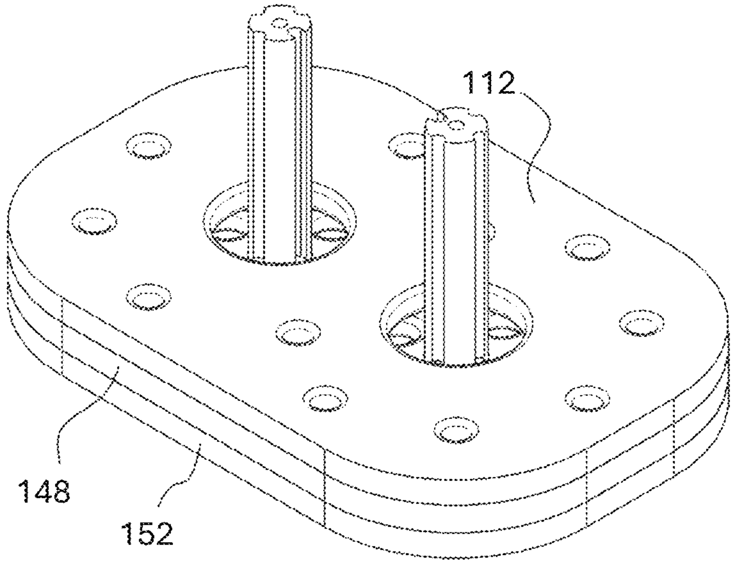
Figure 5A:
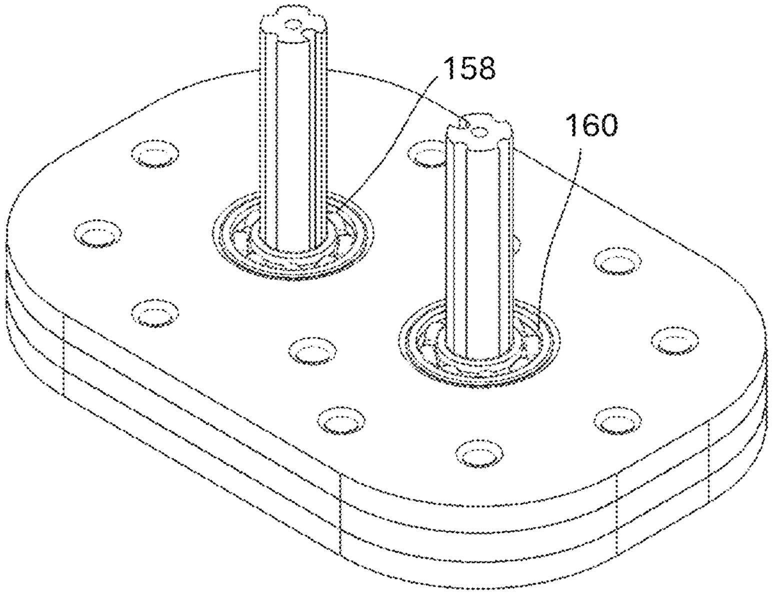

In FIG. 4, the lower panel 112 is stacked on the gear plate 148, such that the shafts traverse the respective openings of the lower panel 112. In FIG. 5*a*, lower bearings 158 and 160 are joined to the respective openings in the lower panel and to the respective shafts. The lower bearings allow for the rotation of the shafts with respect to the lower panel while preventing fluid flow between through the bearings.

Figure 5B:
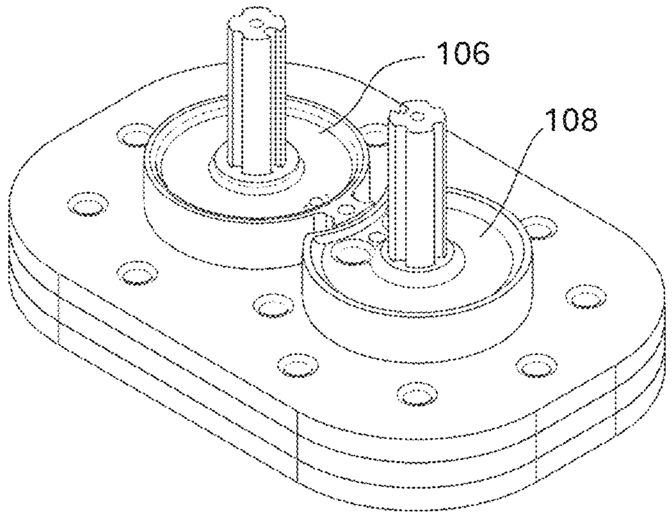
Figure 6:
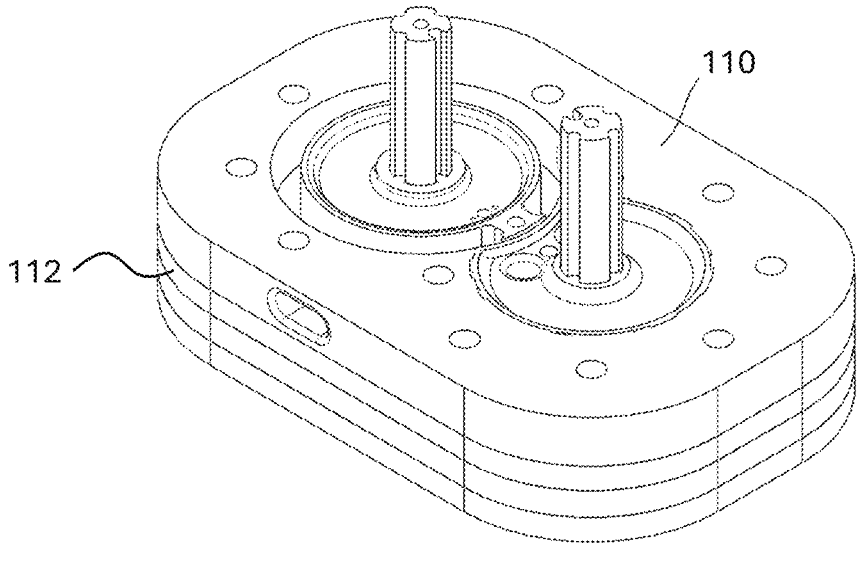

In FIG. 5*b*, the power disc 106 and the gate disc 108 are joined to the first shaft and second shaft, respectively, (note the keyed connection between the power disc 106 and the first shaft and the keyed connection between the gate cam disc and the second shaft), placed on the lower panel, and positioned such that the moment beam of the power disc 106 in the middle of the indentation of the gate cam disc 108. In FIG. 6, the compression plate 110 is placed on the lower panel 112 such that the cavity of the compression plate contains the power disc and gate disc.

Figure 7:
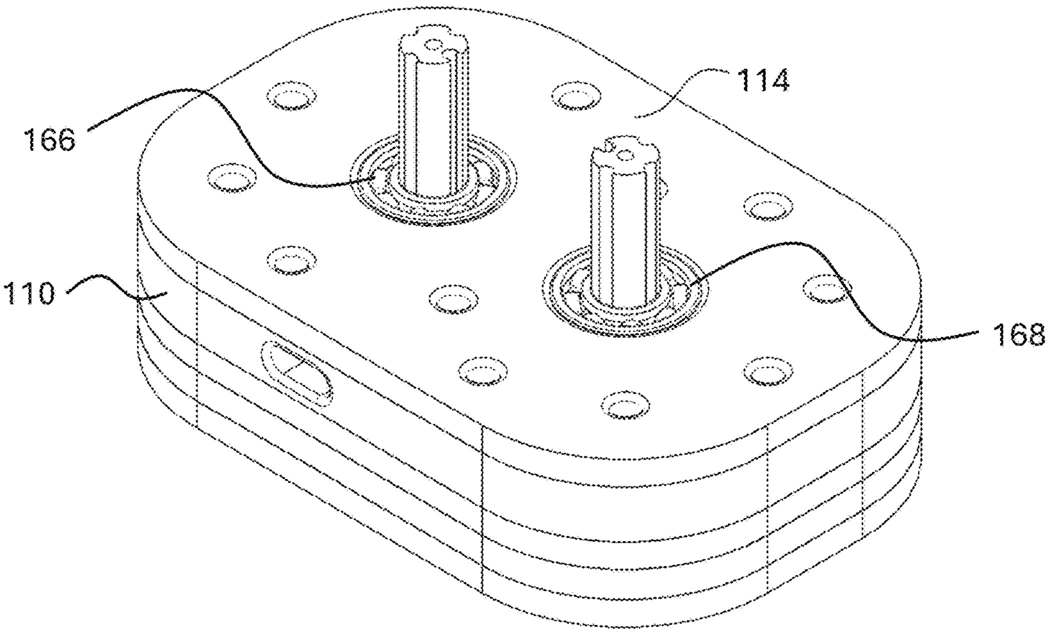

In FIG. 7, the upper panel 114 is placed on the compression plate 110 to cover the cavity of the compression plate from above. Upper bearings 166 and 168 are joined to respective holes of the upper panes and to the first and second shafts, respectively, in the same manner that was explained above with reference to FIG. 5*a*.

Figure 8:
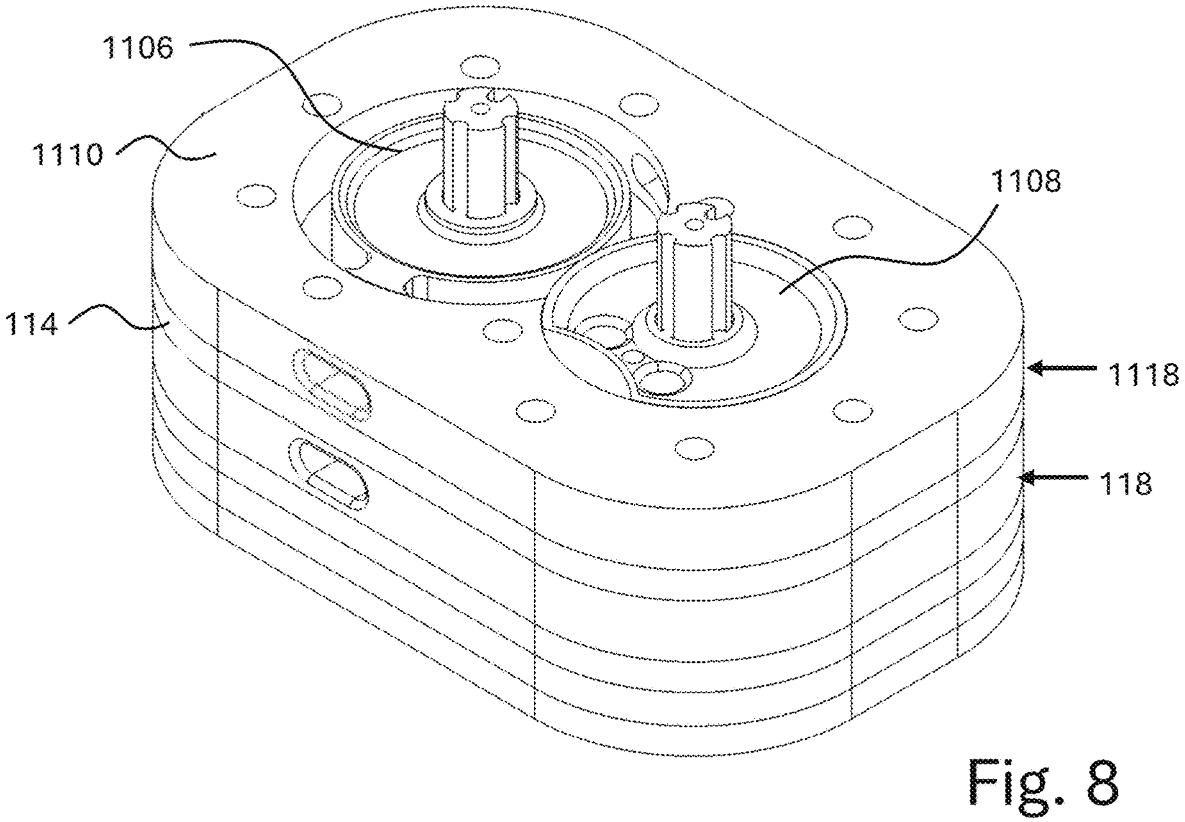
FIG. 8 illustrates an effort machine having two energy conversion units, according to some embodiments of the present invention.

FIG. 8 illustrates an effort machine having two energy conversion units, according to some embodiments of the present invention.

It may be advantageous to some users to have more than one energy conversion unit in a single effort machine. FIG. 8 shows a second energy conversion unit 1118 (which includes a second power disc 1106, a second gate cam disc 1108, and a second compression unit 1110) stacked on the upper panel 114 which closes a first (lower) energy conversion unit 118. It should be noted that the effort machine of FIG. 8 is visually incomplete as shown, as a further upper panel is needed to close the second energy conversion unit 1118. The upper panel 114 acts as the lower panel for the second energy conversion unit 1118. The second conversion unit 1118 is similar to the conversion unit 118 described above.

In some embodiments, the second power disc 1106 is aligned with the lower power disc (i.e., the respective moment beams have the same orientation) and the second gate disc 1108 is aligned with the lower gate disc (i.e., the respective indentations have the same orientation).

In some embodiments, the second power disc 1106 is not aligned with the lower power disc (i.e., the respective moment beams have different orientations) and the second gate disc 1108 is not aligned with the lower gate disc (i.e., the respective indentations have different orientation). In some embodiments of the present invention, the lower power disc and the second power disc are 180 degrees out of phase for enhanced operation. Additional energy conversion units in the stack up may be incorporated.

Figure 9:
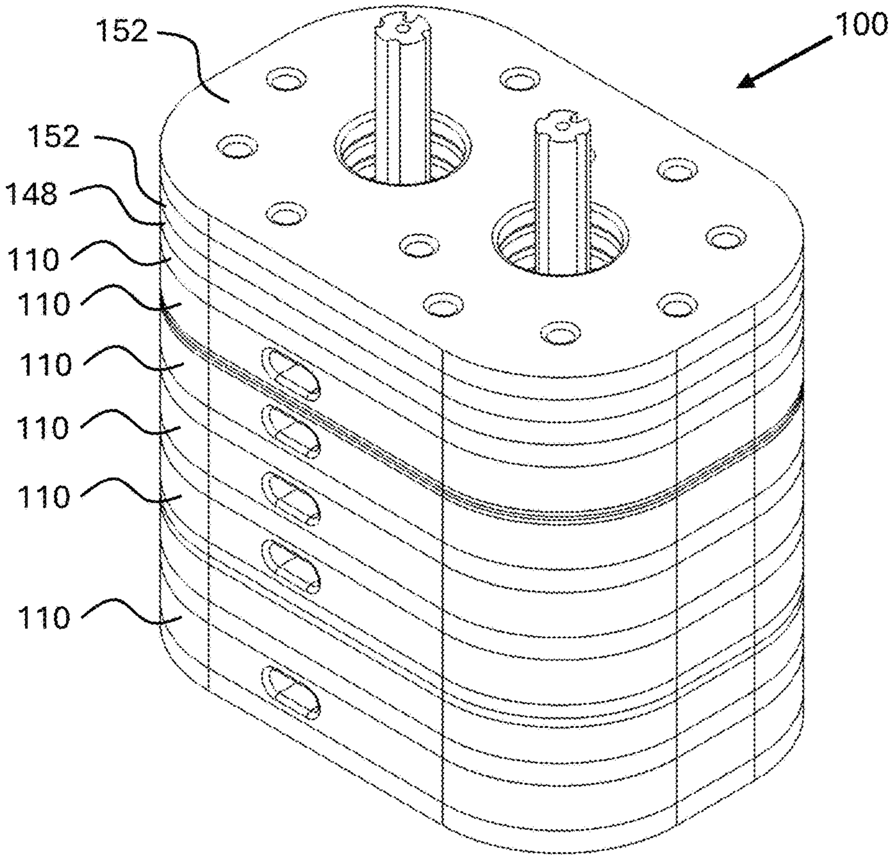
FIG. 9 illustrates an effort machine having a plurality of energy conversion units stacked in line, according to some embodiments of the present invention.

FIG. 9 illustrates an effort machine having a plurality of energy conversion units stacked in line, according to some embodiments of the present invention.

As noted above, the effort machine of the present invention is modular and may be built in different manners. In the example of FIG. 9, the timing apparatus is above the energy conversion units 118. Moreover, the timing apparatus may include two end panels 152 located above a gear plate 148.

FIGS. 11-15 illustrate different stages in the timed rotation on a power disc and gate disc, indicating input and exhaust cycle sequencing, according to some embodiments of the present invention.

If the rotation can be induced by rotating the shafts, the effort machine can be used as a pump. If the rotation is induced by fluid flow from the inlet to the outlet or by combustion, the effort machine can be used to generate rotational energy-which can be converted to electricity and/or used directly to power as a motor.

FIGS. 11-15 will be explained three times: once for rotation induced by rotation of the shafts via an outside force, once for rotation induced by flow of a pressurized fluid from inlet to outlet, and once from rotation induced by combustion.

Embodiment 1: Shafts are Rotated

Figure 11:
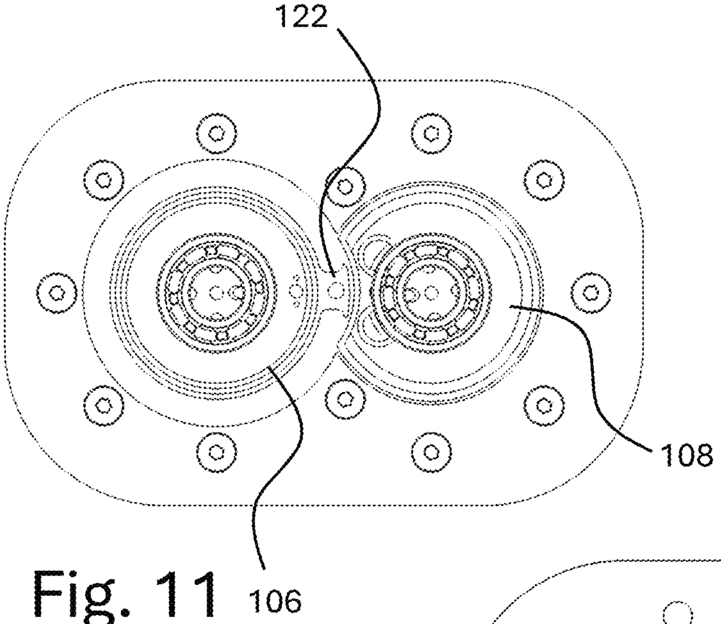
FIGS. 11-15 illustrate consecutive sequential stages in the timed rotation on a power disc and gate disc, according to some embodiments of the present invention.

In FIG. 11, the energy conversion unit 118 is at an initial position where the moment beam 122 of the power disc 106 is oriented along to the line between the centers of the discs 106 and 108 and is located in the center of the indentation of the gate disc 108.

Figure 12:
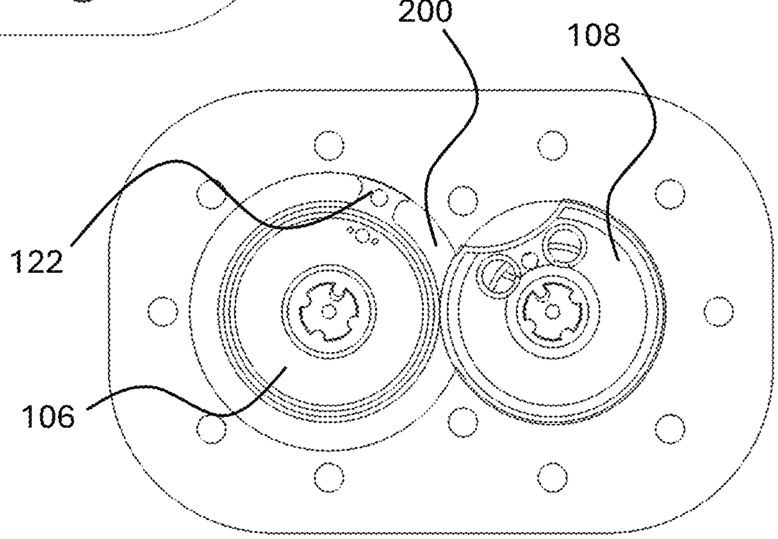

In FIG. 12, the shafts are rotated so the moment beam clears the inlet opening (not shown). A valve associated with the inlet is opened so that a space 200 between the moment beam and partial circumference of the gate cam disc is in fluid communication with a source of fluid (gas and/or liquid).

Figure 13:
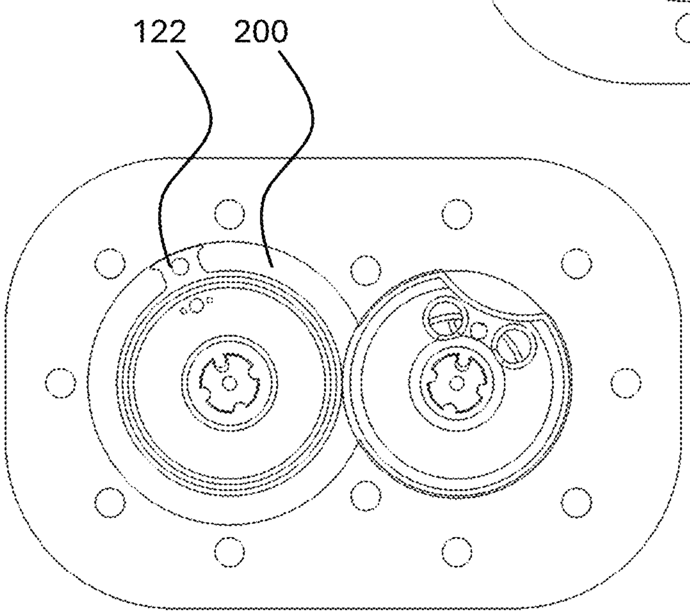
Figure 14:
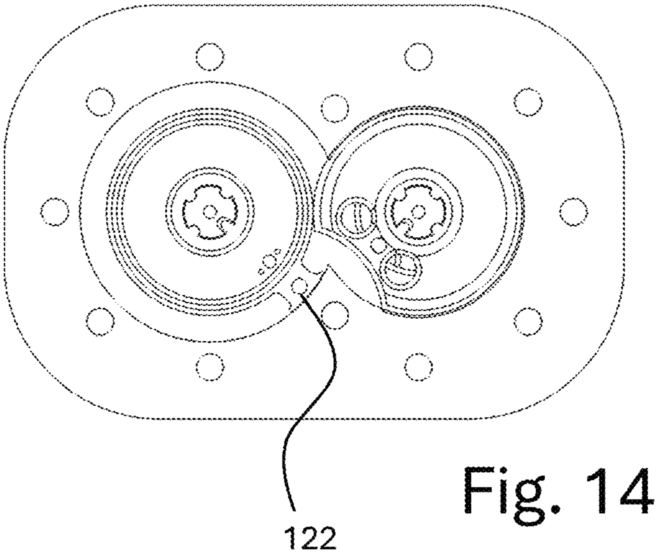

In FIG. 13, the shafts are rotated further, so the volume of the space 200 increases, causing fluid to flow into the space 200 from the inlet. In FIG. 14, the shafts are rotated further, and the moment beam has just cleared the opening the outlet. The fluid drawn during the motion from FIGS. 12 to 14 has gained a certain velocity and is ejected via the outlet. In some embodiments of the present invention, the valve associated with the inlet is closed at this stage to be reopened again when the position of FIG. 12 is achieved again in the next cycle.

Figure 15:
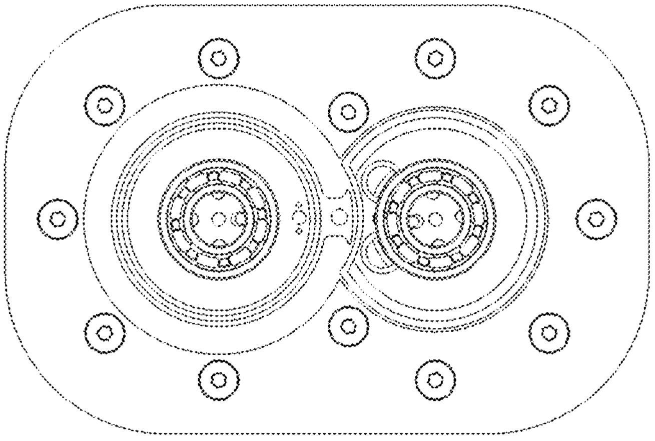

In FIG. 15, the shafts are rotated and the energy conversion apparatus returns to the initial position, in preparation for a new cycle.

From the above, it can be understood that by driving the rotation of the shafts, the power disc and the gate cam disc are rotated to create a fluid flow in the cavity of the compression plate from inlet to outlet. Therefore, mechanical rotation energy is converted into a fluid flow. In this manner, the effort machine can be used as a pump to drive a fluid.

Embodiment 2: Pressurized Fluid (e.g., Liquid, Gas, Vapor, Steam)

In FIG. 11, the energy conversion unit 118 is at an initial position where the moment beam 122 of the power disc 106 is oriented along to the line between the centers of the discs 106 and 108 and is located in the center of the indentation of the gate cam disc 108.

In FIG. 12, the shafts are rotated so the moment beam clears the inlet opening (not shown). A valve associated with the inlet is opened so that a space 200 between the moment beam and partial circumference of the gate cam disc is in fluid communication with a source of pressurized fluid (gas and/or liquid).

A pressurized fluid enters the space 200 (and cannot leave though the inlet due to a one-way valve described above). The increase of pressure inside the space 200 causes the power disc 106 to rotate counterclockwise. Because of the timing unit (which links the rotations of the power disc and gate cam disc), the gate cam disc 108 rotates clockwise by the same angle, as can be seen in FIG. 13.

In FIG. 14, the moment beam has just cleared the opening of the outlet. The pressurized fluid is ejected via the outlet. In some embodiments of the present invention, a valve associated with the inlet to regulate intake of the pressurized fluid is closed at this stage to be reopened again when the position of FIG. 12 is achieved again in the next cycle.

In FIG. 15, the energy conversion apparatus returns to the initial position, in preparation for a new cycle, either by speed imparted by the pressurized fluid or by a rotation of the shafts.

It can be seen from above, that the effort machine of the present invention converts fluid pressure into rotational motion. In this manner, the effort machine of the present invention can be used as a generator, motor, or engine.

Embodiment 3: Combustion

In FIG. 11, the energy conversion unit 118 is at an initial position where the moment beam 122 of the power disc 106 is oriented along to the line between the centers of the discs 106 and 108 and is located in the center of the indentation of the gate disc 108.

In FIG. 12, the shafts are rotated so the moment beam clears the inlet opening (not shown) and the ignition port. A valve associated with the inlet is opened so that a space 200 between the moment beam and partial circumference of the gate disc is in fluid communication with a source of combustion fuel and air.

The combustion fuel and air enter the space 200 (and cannot leave though the inlet due to a one-way (check) valve described above). The ignition device is operated to create a spark that causes combustion of the air. Combustion causes an increase of pressure inside the space 200, which in turn causes the power disc 106 to rotate counterclockwise. Because of the timing unit (which links the rotations of the power disc and gate cam disc), the gate cam disc 108 rotates clockwise by the same angle, as can be seen in FIG. 13.

In FIG. 14, the moment beam has just cleared the opening the outlet. The combusted gas is ejected via the outlet. In some embodiments of the present invention, a valve associated with the inlet to regulate intake of the combustible gas and combustion fuel is closed at this stage to be reopened again when the position of FIG. 12 is achieved again in the next cycle.

In FIG. 15, the energy conversion apparatus returns to the initial position, in preparation for a new cycle, either by speed imparted by the combustion process or by a rotation of the shafts.

It can be seen from above, that the effort machine of the present invention converts chemical energy from an exothermal reaction (combustion) to rotational motion. The rotational motion may be useful to power a generator, a motor, or an engine.

The conversion from an exothermal reaction (combustion) to rotational motion is done through motion that that does not change direction (contrary to combustion processes in the general art). It should be noted that though combustion was described in this example, other exothermal reactions may be used to create rotational power, by selecting appropriate reagents and injecting the reagents into the space 200.

Figure 16:
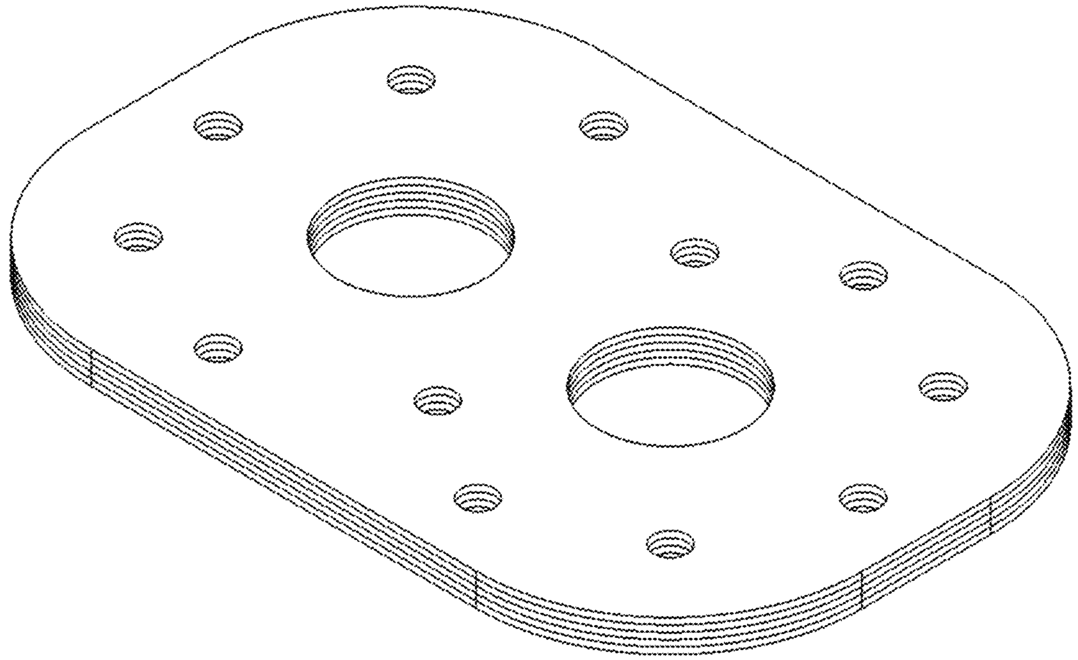
FIGS. 16 and 17 illustrate different constructions showing sheets that may be formed by layered sub panels, and sheets formed by a single panel layer, according to some embodiments of the present invention.
Figure 17:
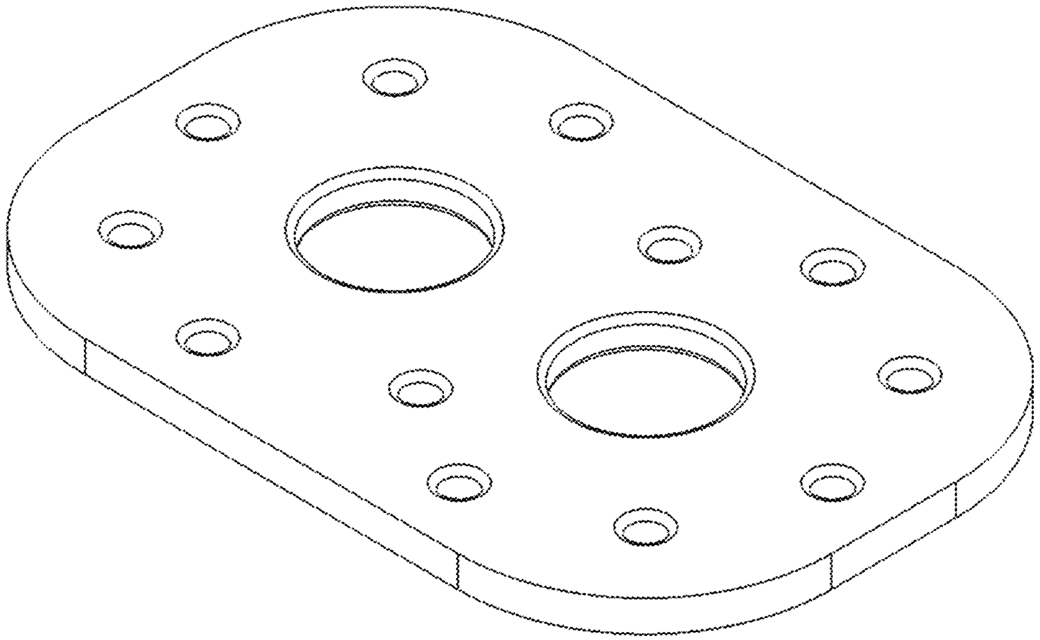

FIGS. 16 and 17 illustrate different constructions showing sheets that may be formed by layered sub panels, and sheets formed by a single panel layer, according to some embodiments of the present invention.

The plates 110 and 148, and panels 112, 114, and 152, the discs 106 and 108 of FIG. 1 may be made of several similar sub-panels laminated, joined together, stacked up together, bonded together to form a single sheet, plate or panel (FIG. 16) or may be made as a single sheet of material (FIG. 17).

Figure 18:
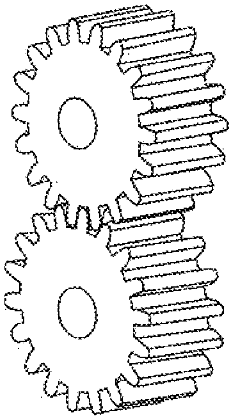
FIGS. 18-20 illustrated different types of gears that may be used in the timing apparatus, according to some embodiments of the present invention.
Figure 19:
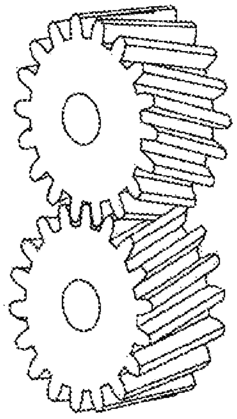
Figure 20:
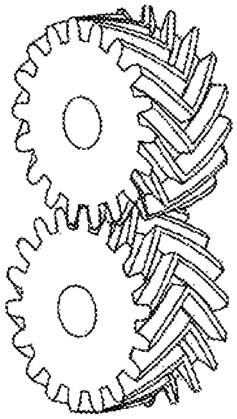
Figure 21:
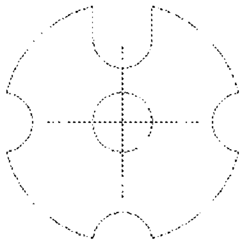
FIGS. 21-25 are examples of top cross-sectional views of types of keyed shafts that can be used in the present invention.
Figure 22:
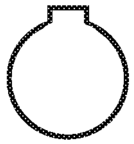
Figure 23:
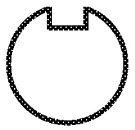
Figure 23:
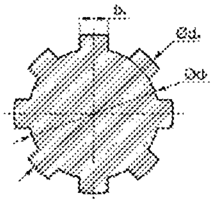
Figure 24:
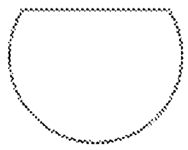
Figure 25:
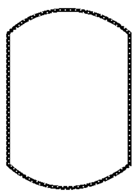

FIGS. 18-20 illustrated different types of gears that may be used in the timing apparatus, according to some embodiments of the present invention.

The gears of the present invention mate while disposed along the same plane. FIG. 18 shows spur gears, FIG. 19 shows helical gears. FIG. 20 shows herringbone gears. Other types of gears, such as cone gears, spiral gears, club shape gears, and spade shape gears may be used too. Various tooth counts and gear tooth pitch may be selected as needed by a user. The sizes of the gears may not be the same, and may be joined in 1:1, 2:1, 1:2 or other formats as chosen by a user.

FIGS. 21-25 are examples of top cross-sectional views of types of keyed shafts that can be used in the present invention. Openings in the power disc, gate disc, gears, and bearings for passage of the shafts have a shape matching the shape of the key shafts, to ensure that such elements rotate with the shafts.

Figure 26:
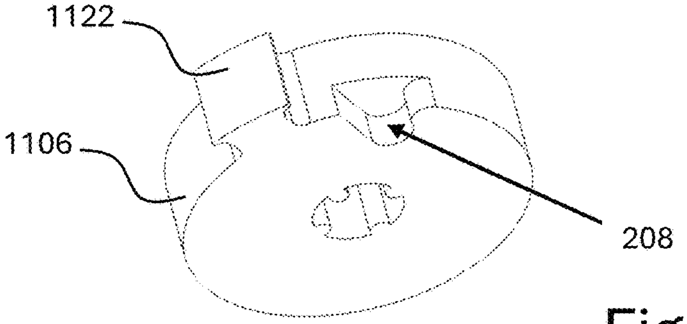
FIG. 26 is an example of a notched power disc, according to some embodiments of the present invention.
Figure 27:
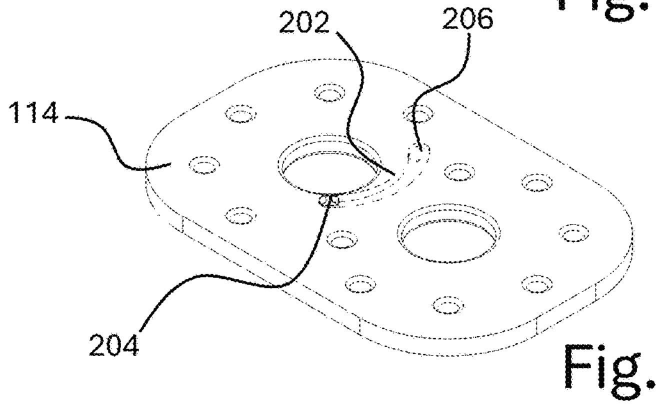
FIG. 27 is an example of a bottom panel with a channel for use with the notched power disc of FIG. 26, according to some embodiments of the present invention.
Figure 28A:
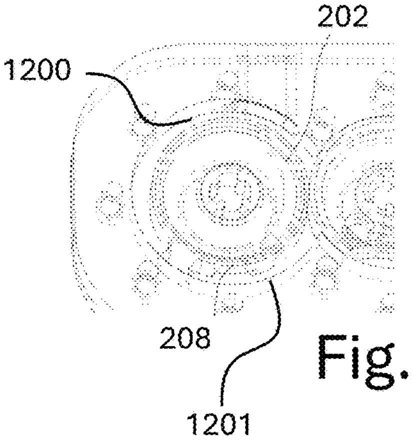
FIGS. 28*a* and 28*b* illustrate the notched power disc of FIG. 26 used with the bottom panel FIG. 27, according to some embodiments of the present invention.
Figure 28B:
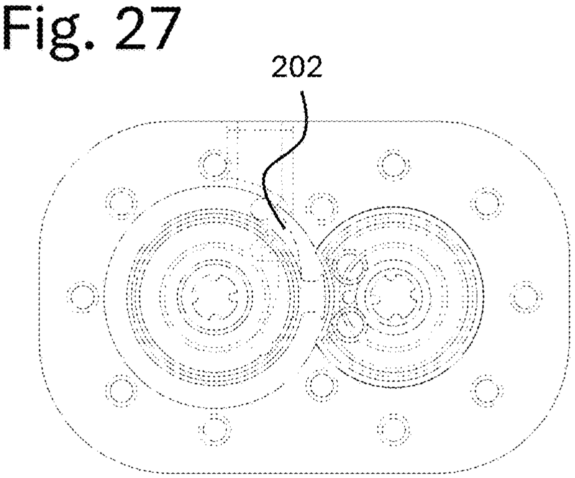
Figure 29:
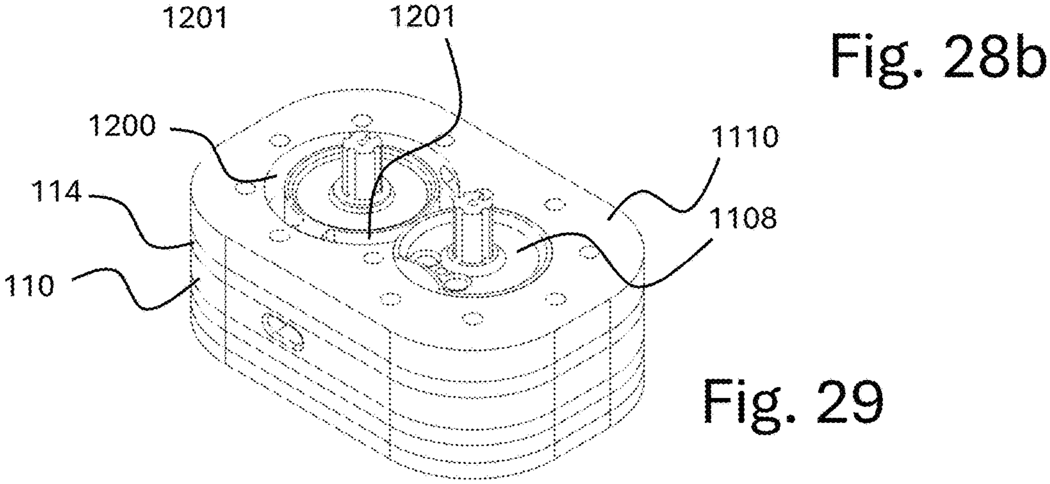
FIG. 29 illustrates a compression chamber with no external outlet for use with the notched power disc of FIG. 26 and the bottom panel FIG. 27, according to some embodiments of the present invention.

FIG. 26 is an example of a notched power disc, according to some embodiments of the present invention. FIG. 27 is an example of a bottom panel with a channel for use with the notched power disc of FIG. 26, according to some embodiments of the present invention. FIGS. 28*a* and 28*b* illustrate the notched power disc of FIG. 26 used with the bottom panel FIG. 27, according to some embodiments of the present invention. FIG. 29 illustrates a compression chamber with no outlet for use with the notched power disc of FIG. 26 and the bottom panel FIG. 27, according to some embodiments of the present invention.

In some embodiments of the present invention, the second compression plate 1110 does not have an outlet. Rather, the top panel 114 between the first compression plate 110 and the second compression plate 1110 has a channel 202 having a first end 204 opening under the second power disc and a second end 206 opening in the vicinity of the inlet of the first compression plate. The second power disc 1106 has a notch 208 located on the bottom and the side of the second power disc, downstream (with respect to the direction of rotation) of the second moment arm 1122 and conforming to the first end 204 of the channel 202.

As the space 1200 upstream of the second moment beam 1122 expands (as explained above), the space 1201 downstream of the second moment beam 1122 decreases. Because the second (upper) compression plate does not have an outlet, gas trapped in the space 1201 is compressed.

When the notch 208 aligns with the first end 204 of the channel 202, the compressed gas flows from the space 1201 through the notch 208 into the channel 202 and then to the cavity of the lower compression plate.

In some embodiments of the present invention, the second end 206 of the channel opens within the first wall in the vicinity of the first end of the first wall of the lower cavity of the lower compression plate. The position of the moment beam 122 of the first (lower) power disc 106 is offset from the position of the second moment beam 1122 of the second (upper) power disc 1106. More specifically, when the notch is aligned with the first end 204 of the channel 202, the first moment beam 122 has just cleared the inlet, such that a space 200 is formed between the first moment beam and the partial circumference of the gate disc 108. Therefore, the pressurized gas, fills the space 200 and applies pressure to the first moment beam 112 to further help rotate the power disc 106.

In some embodiments, the compressed gas from the upper stage goes into the space between the first moment beam and the partial circumference of the gate can disc 108 of the lower compression plate, to increase pressure in that space. The quick rise in pressure in the space between the first moment beam and the partial circumference of the gate can disc 108 of the lower compression plate provides the compression stage of a combustion cycle in the lower compression plate, providing a more efficient combustion.

Figure 30:
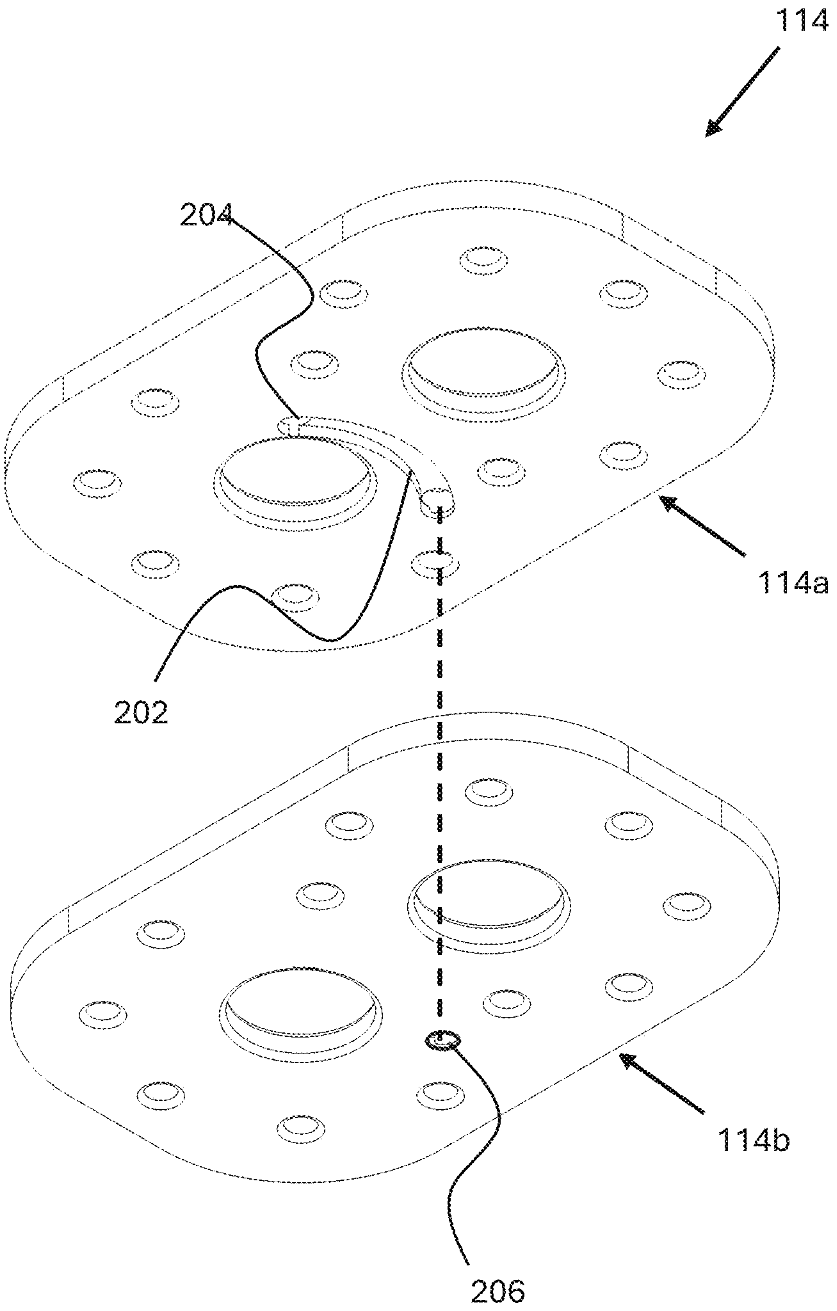
FIG. 30 illustrates an exploded view of channeled top panel 114 made of two subpanels, according to some embodiments of the present invention.

FIG. 30 illustrates an exploded view of channeled top panel 114 made of two subpanels 114*a* and 114*b*. The view is from a three quarters bottom view. The subpanel 114*a* has the channel 202 carved on the bottom surface thereof, with a first opening 204 traversing the subpanel 114*a* to receive pressurized gas from the upper compression plate. The subpanel 114*b* closes the channel 202 from below, except at an opening 206, which is the second opening 206 for exhausting the pressurized gas into the lower compression plate. In some embodiments of the present invention, the channeled top panel only includes the top subpanel 114*a*.

Figure 31:
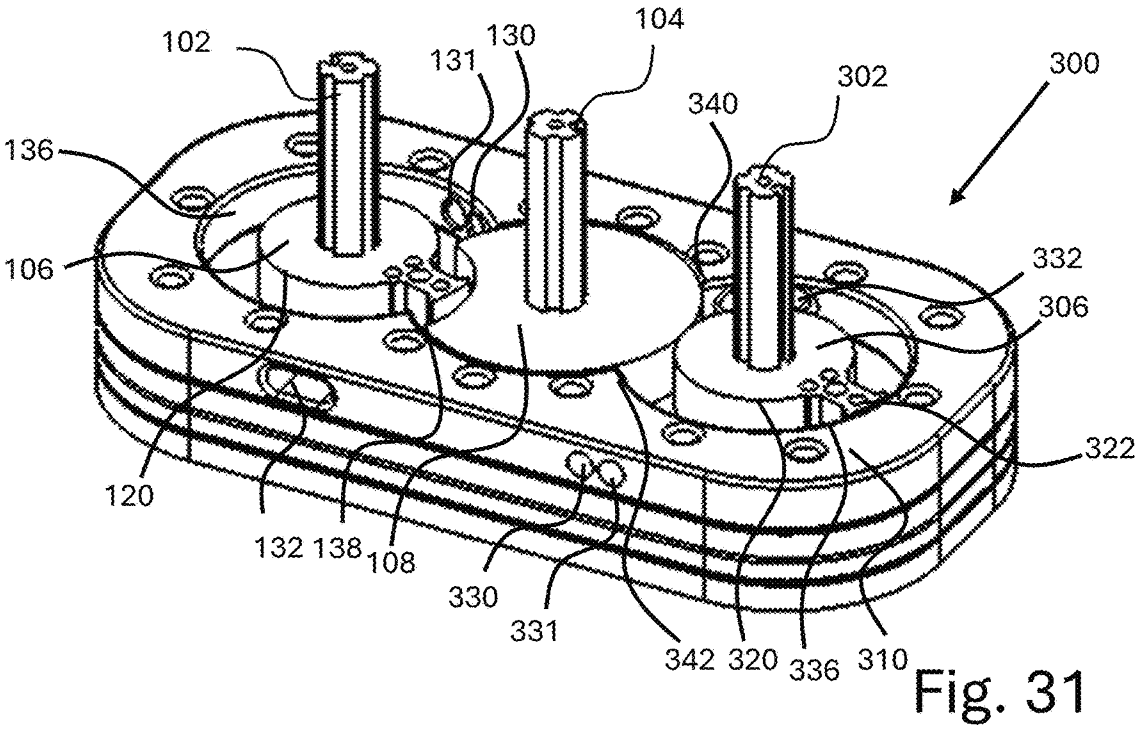
FIG. 31 illustrates an effort machine, in which the energy conversion unit has two power discs and three rotational shafts according to some embodiments of the present invention.

FIG. 31 illustrates an effort machine, in which the energy conversion unit has two power discs, according to some embodiments of the present invention. FIGS. 32-39 illustrate different stages in the timed rotation of the two power discs and of the gate disc of the energy conversion unit of FIG. 31, according to some embodiments of the present invention.

The effort machine 300 has an energy conversion unit 318 which has all the features of the conversion unit 118 of FIG. 10. In addition. The effort machine 300 includes a third shaft 302 and a second power disc 306. The second power disc 306 is joined to the third shaft 302 to rotate coaxially with the third shaft 302 (in the same manner the first power disc rotates with the first shaft 102 as explained above). The second power disc has a second circumference 320 and a second moment beam 322 extending radially from a portion of the second circumference.

The compression plate 310 comprises a third curved wall 336 centered about the third shaft and having a third end 340 and fourth end 342. The third curved wall 336 meets the second curved wall 138 at the third end 340 and the fourth end 342, such that the cavity is bounded by the first wall 136, the second wall 138, and the third wall 336. The timing apparatus is coupled to the first shaft, the second shaft, and the third shaft.

Figure 33:
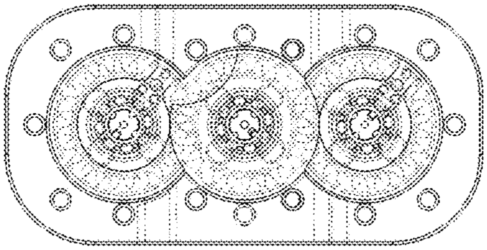
Figure 34:
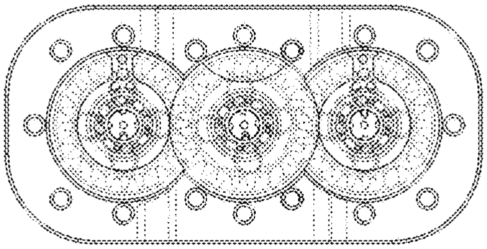
Figure 35:
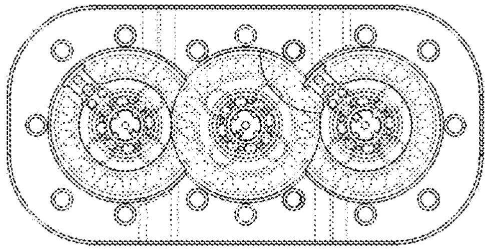

The first rotational range comprises a first subrange, a second subrange, and a third subrange. In the first subrange of the first rotational range, the first circumference of the first power disc 106 contacts the partial circumference 130 of the gate disc 108, while the second circumference 320 of the second power disc 308 contacts the partial circumference 130 of the gate disc (FIGS. 33-35).

Figure 36:
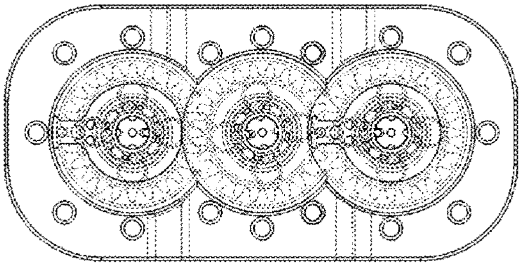

In the second subrange of the first rotational range, the first circumference of the first power disc contacts the partial circumference of the gate disc, while the second moment beam 322 of the second power disc is contained within the indentation of the gate cam disc (FIG. 36).

Figure 37:
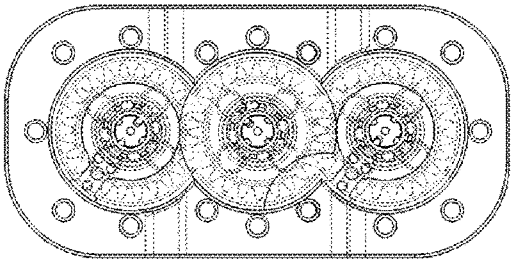
Figure 38:
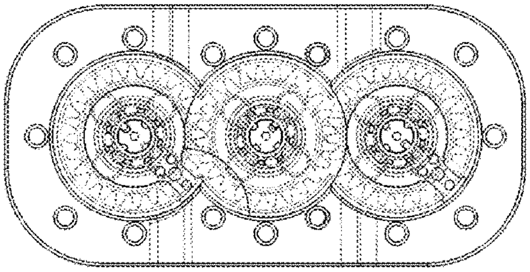

In the third subrange of the first rotational range, the first circumference of the first power disc contacts the partial circumference of the gate disc, while the second circumference of the second power disc contacts the partial circumference of the gate disc (FIGS. 37-38).

Figure 32:
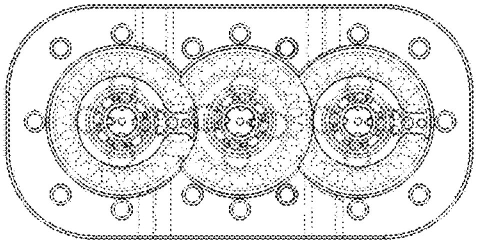
FIGS. 32-39 illustrate different stages in the timed rotation of the two power discs and of the gate disc of the energy conversion unit of FIG. 30, according to some embodiments of the present invention.
Figure 39:
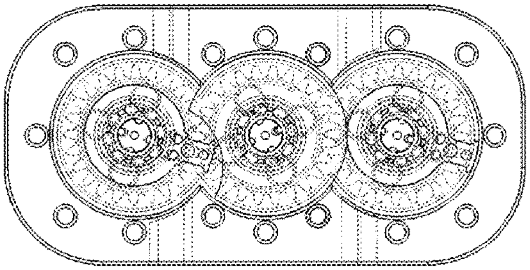

In the second rotational range, the first moment beam of the first power disc is contained within the indentation of the gate disc, while the second circumference of the second power disc contacts the partial circumference of the gate disc (FIGS. 32 and 39).

Figure 54:
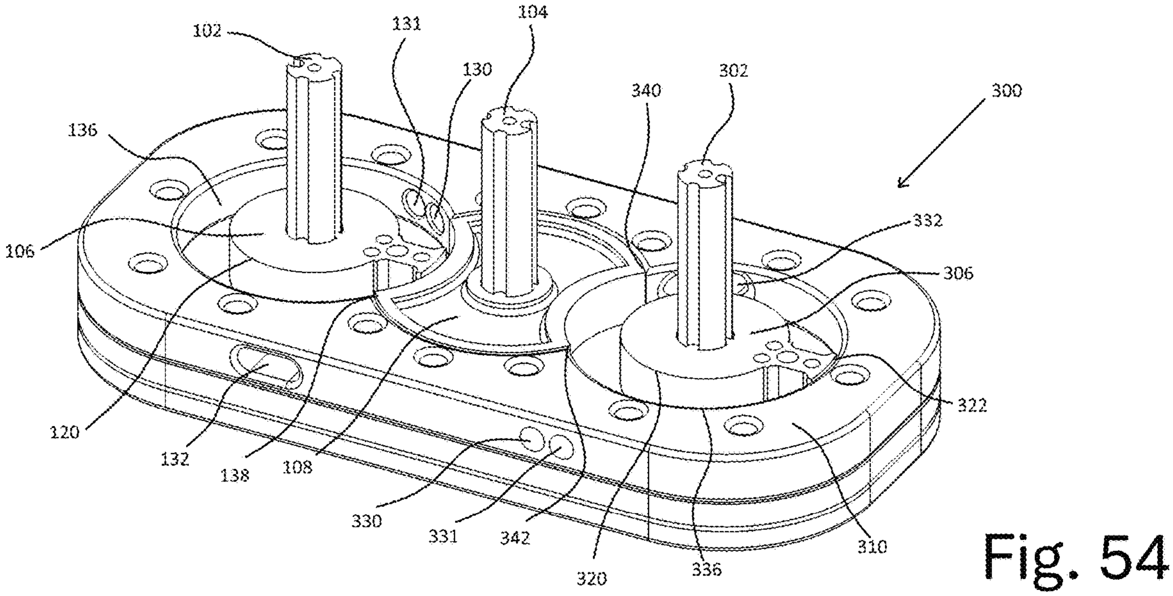
FIG. 54 illustrates an effort machine, in which the energy conversion unit has two power discs, according to some embodiments of the present invention.

FIG. 54 illustrates an effort machine, in which the energy conversion unit has two power discs, according to some embodiments of the present invention. FIGS. 55-61 illustrate consecutive sequential stages in the timed rotation of the two power discs and of the gate disc of the energy conversion unit of FIG. 54, according to some embodiments of the present invention.

The effort machine 300 has an energy conversion unit 318 which has all the features of the conversion unit 118 of FIG. 10. In addition. The effort machine 300 includes a third shaft 302 and a second power disc 306. The second power disc 306 is joined to the third shaft 302 to rotate coaxially with the third shaft 302 (in the same manner the first power disc rotates with the first shaft 102 as explained above). The second power disc has a second circumference 320 and a second moment beam 322 extending radially from a portion of the second circumference.

The compression plate 310 comprises a third curved wall 336 centered about the third shaft and having a third end 340 and fourth end 342. The third curved wall 336 meets the second curved wall 138 at the third end 340 and the fourth end 342, such that the cavity is bounded by the first wall 136, the second wall 138, and the third wall 336. The timing apparatus is coupled to the first shaft, the second shaft, and the third shaft.

Moreover, the gate cam disc has a perimeter that comprises a first partial circumference 126*a*, a first indentation 128*a*, a second partial circumference 126*b*, and a second indentation 128*b*, such each of the partial circumferences is adjacent to the first indentation and the second indentation, while being opposite to each other.

Figure 56:
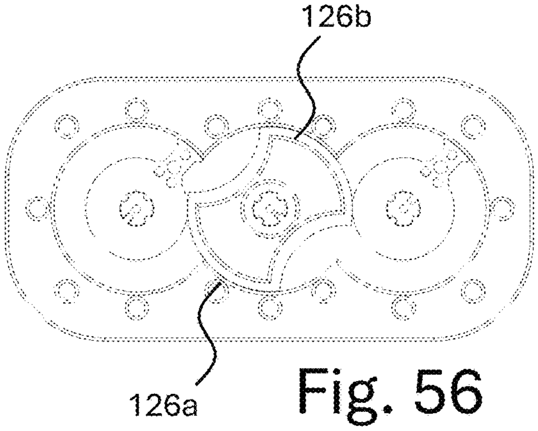
Figure 57:
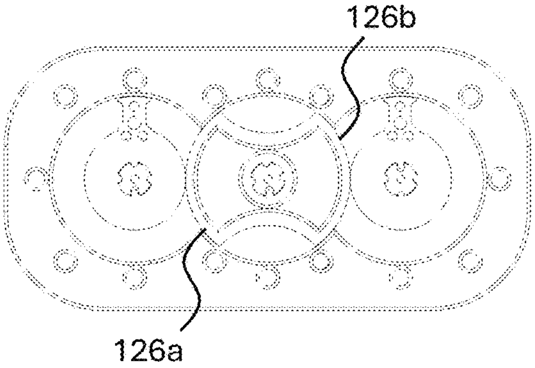
Figure 58:
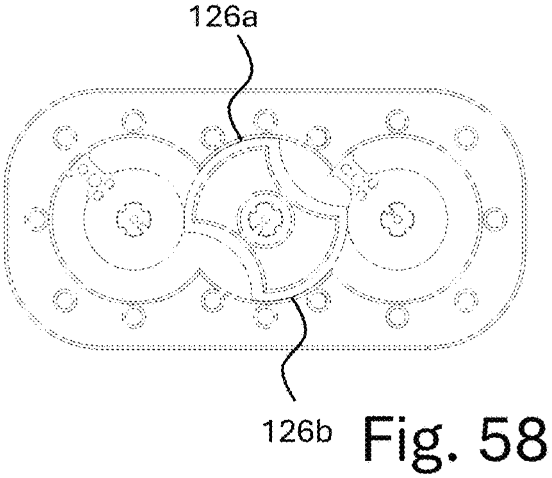

The first rotational range comprises a first subrange, a second subrange, and a third subrange. In the first subrange of the first rotational range, the first circumference 120 of the first power disc 106 contacts the first partial circumference 126*a* of the gate cam disc 108, while the second circumference 320 of the second power disc 308 contacts the second partial circumference 126*b* of the gate disc (FIGS. 56-58).

Figure 59:
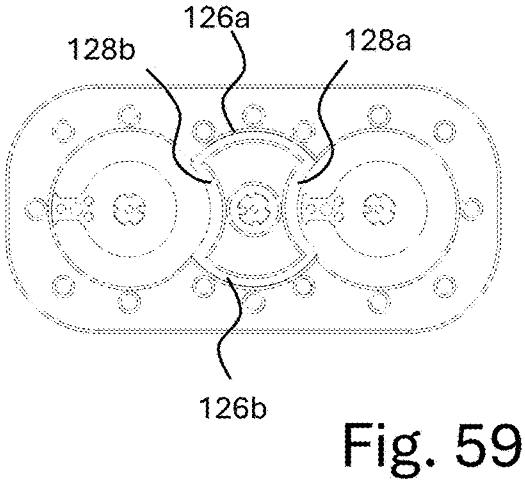

In the second subrange of the first rotational range, the first circumference 120 of the first power disc faces the second indentation 128*b* of the gate cam disc, while the second moment beam 322 of the second power disc is contained within the first indentation 128*a* of the gate cam disc (FIG. 59).

Figure 60:
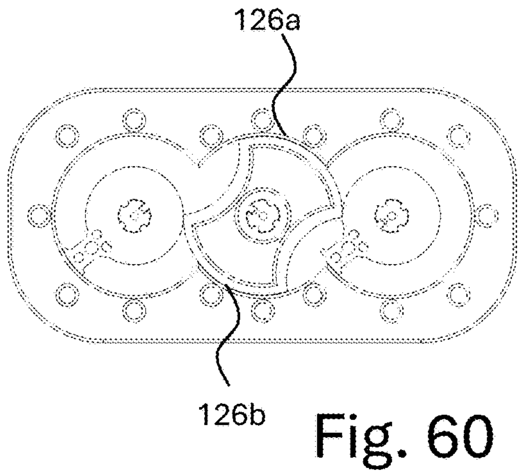

In the third subrange of the first rotational range, the first circumference of the first power disc contacts the second partial 126*b* circumference of the gate cam disc, while the second circumference of the second power disc contacts the first partial circumference 126*a* of the gate disc (FIG. 60).

Figure 55:
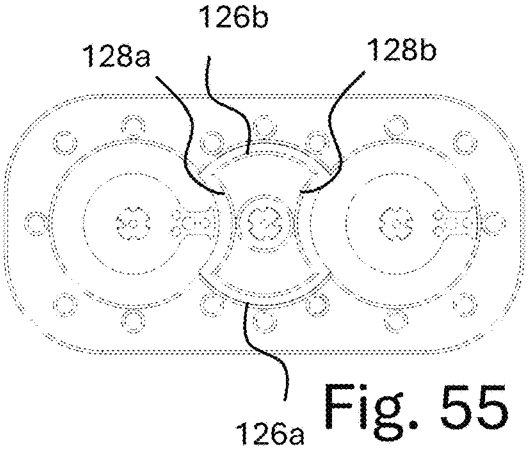
FIGS. 55-61 illustrate consecutive sequential stages in the timed rotation of the two power discs and of the gate disc of the energy conversion unit of FIG. 54, according to some embodiments of the present invention.
Figure 61:
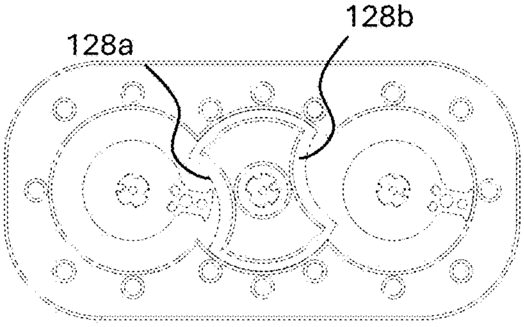

In the second rotational range, the first moment beam of the first power disc is contained within the first indentation 128*a* of the gate cam disc, while the second circumference of the second power disc face (but does not contact) within the second indentation 128*b* of the gate cam disc (FIGS. 55 and 61).

Figure 62:
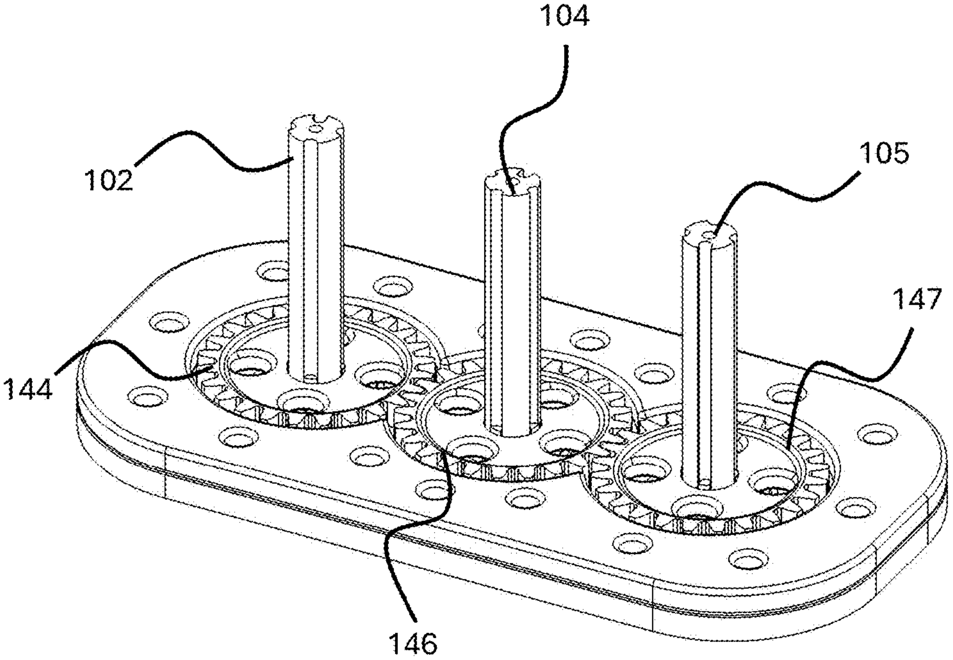
FIG. 62 illustrates a timing apparatus which includes three gears, according to some embodiments of the present invention.

Referring to the embodiments described above, in which three discs (two power discs and a gate cam disc) are present, in some embodiments of the present invention, the timing apparatus includes a first gear 144, a second gear 146, and a third gear 147, as shown in FIG. 62. The first gear 144 is joined to the first shaft 102 to rotate (optionally coaxially) with the first shaft 102. The second gear 146 is meshed with the first gear 144, and is joined to the second shaft 104 to rotate (optionally coaxially) with the second shaft. The third gear 147 is meshed with the second gear 146, and is joined to the third shaft 105 to rotate (optionally coaxially) with the third shaft 105. The first gear, the second gear, and the third gear are located outside the compression plate 310, beyond the lower panel or beyond the upper panel.

Figure 40:
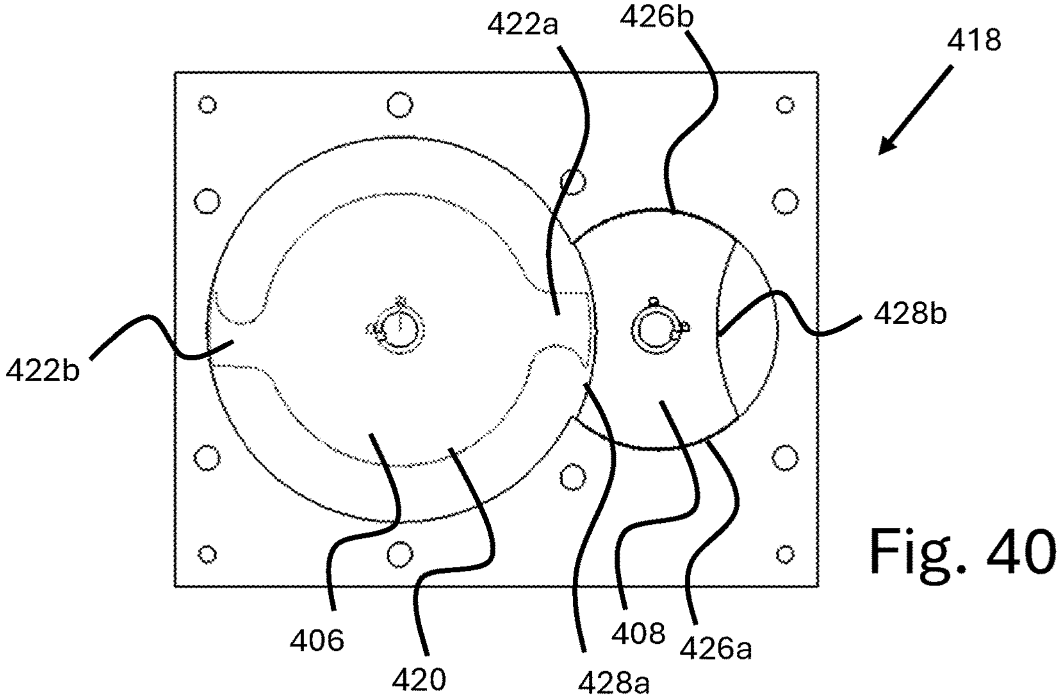
FIG. 40 illustrate a energy conversion unit with a power disc having two moment beams and gate disc having two indentations for receiving the respective moment beams, according to some embodiments of the present invention.

FIG. 40 illustrates an energy conversion unit 418 with a power disc 406 having two moment beams 422*a* and 422*b* and gate disc 408 having two indentations 428*a* and 428*b* for receiving the respective moment beams, according to some embodiments of the present invention. FIGS. 47-53 illustrate a progression of successive stages in the timed rotation of the power disc and of the gate cam disc of the energy conversion unit 418 of FIG. 40, according to some embodiments of the present invention.

The energy conversion unit 418. is similar to the energy conversion unit 118 of FIG. 10. The differences between the energy conversion unit 418 and the energy conversion unit 118 are the following:

The power disc 406 is joined to the first shaft to rotate with the first shaft. The power disc has a first circumference 420, a first moment beam 422*a* extending radially from a first portion of the first circumference, and a second moment beam 422*b* extending radially from a second portion of the first circumference opposite to the first portion.

The gate cam disc 408 (also called gate disc) is joined to the second shaft to rotate with the second shaft. The gate disc has a perimeter that comprises a first partial circumference 426*a*, a first indentation 428*a*, a second partial circumference 426*b*, and a second indentation 428*b*, such each of the partial circumferences is adjacent to the first indentation and the second indentation, while being opposite to each other.

Figure 51:
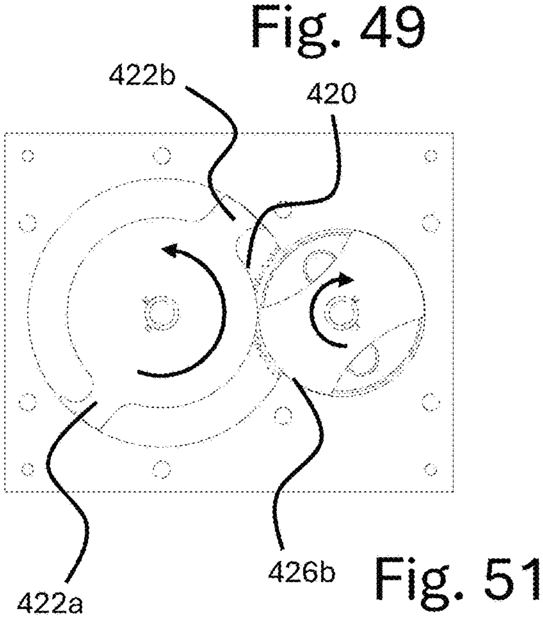
Figure 52:
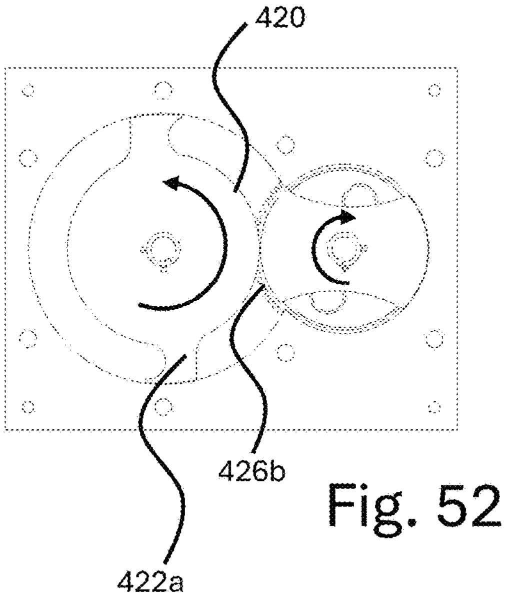
Figure 53:
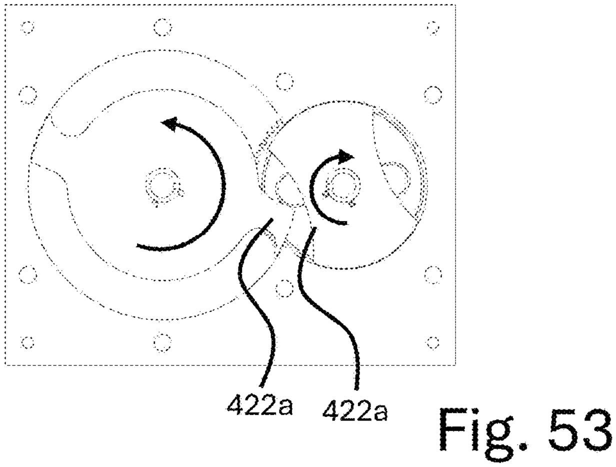

The timing apparatus is coupled to the first shaft and to the second shaft and configured to control a rotation of the gate disc 408 and the power disc 406, such that:

- at a first rotational range, the first moment 422*a* beam is contained in the first indentation 428*a* (see FIGS. 40 and 53).
- at a second rotational range, the first circumference 420 contacts the first partial circumference 426*a* (FIGS. 47 and 48);
- at a third rotational range, the second moment beam 422*b* is contained in the second indentation 428*b* (FIGS. 49-50);
- at a fourth rotational range, the first circumference 420 contacts the second partial circumference 426*b* (FIGS. 51-52).

The first curved wall of the compression panel is configured such that the first moment beam and the second moment beam are flush with the first curved wall when not in respective ones of the first indentation and the second indentation.

Figure 41:
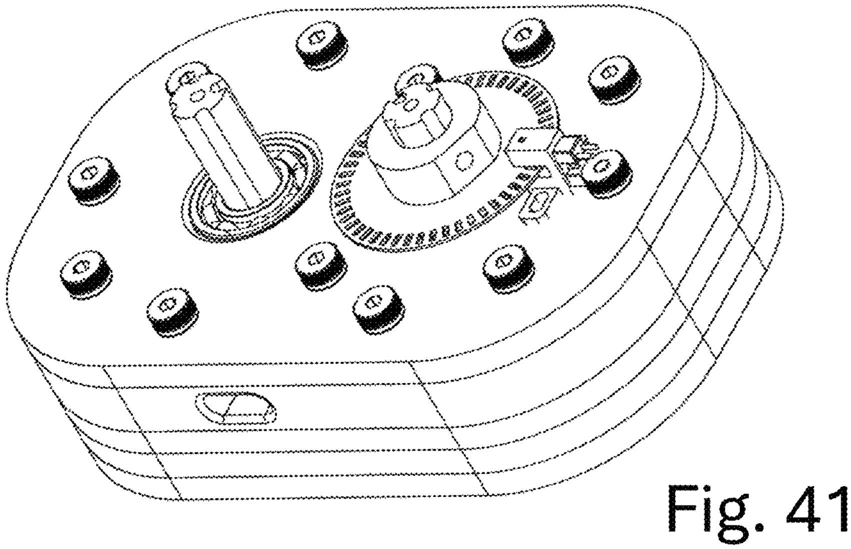
FIGS. 41-44 illustrate examples of detection systems for detecting position, location and the rotations of the power disc and gate disc, according to some embodiments of the present invention.
Figure 42:
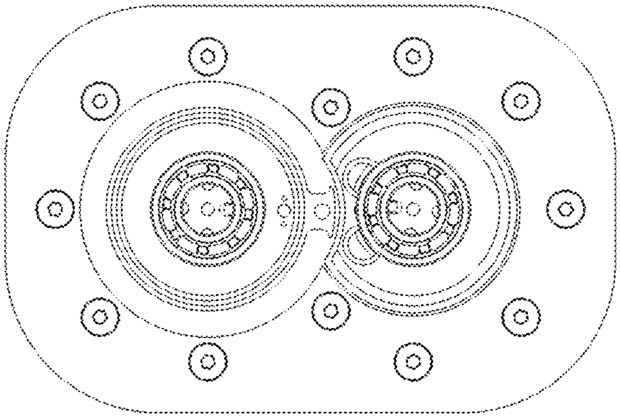
Figure 43:
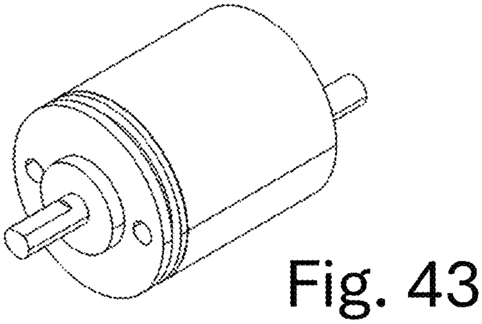

FIGS. 41-43 illustrate examples of detection systems for detecting the orientation of the power disc and gate disc, according to some embodiments of the present invention. Variant possibilities of position detection become apparent with those familiar with mechanical position detection techniques and the science thereof and are within the scope of the present invention. Examples of these possibilities may include (but are not limited to) slotted disks, home location detection, gear tooth position detection, proximity sensors, rotary encoders, proximity sensors, mechanical switches, etc.

In some embodiments of the present invention, the effort machine includes a detection system configured to detect a position of the moment beam and of the cam gate indentation. This is important, because if the rotation of the power disc is not synchronized with the rotation of the cam gate disc, the operation of the effort machine is compromised and can lead to the breakdown of the effort machine. When the detection system detects a misalignment between the power disc and the gate disc, the detection system generates a warning or error code to the system. This warning notifies a user, system that a failure has occurred, that realignment, maintenance is required and enables the user to adjust or replace components of the effort machine (such as the timing apparatus or the discs themselves), for examples to achieve realignment.

The detection system may use commonly known components, such as slotted and optical disk and slotted sensors (FIG. 41), rotary position encoders (FIG. 43), lobes and breaker points (FIG. 44), magnets and hall effect sensors (FIG. 42). Alternatively, accelerometers embedded in one or more of the operating discs may be used.

Figure 44:
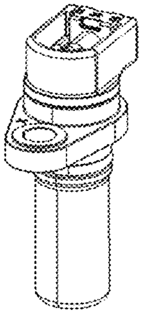

FIG. 43 and FIG. 44 are simple examples of position sensing possibilities. Rotary and proximity sensors, rotary encoders may be a form of rotational position sensing. Typically, these forms of sensors may be attached to the shaft ends, axially coupled to the shaft ends. Variant possibilities of position detection become apparent with those familiar with mechanical position detection techniques and the science thereof. Examples of these possibilities may include (but are not limited to) slotted disks, home location detection, gear tooth position detection, proximity sensors, rotary encoders, mechanical switches, etc.

Figure 45A:
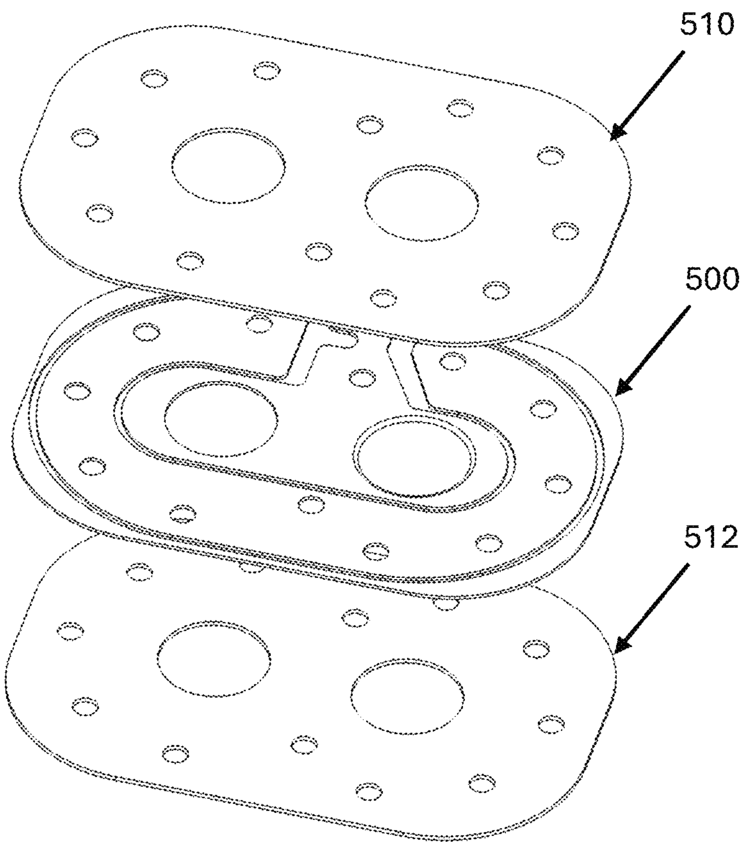
FIGS. 45*a*-45*b* illustrate examples of an upper panel (or lower panel) having grooves for the introduction and circulation of a lubricant and/or coolant, according to some embodiments of the present invention.
Figure 45B:
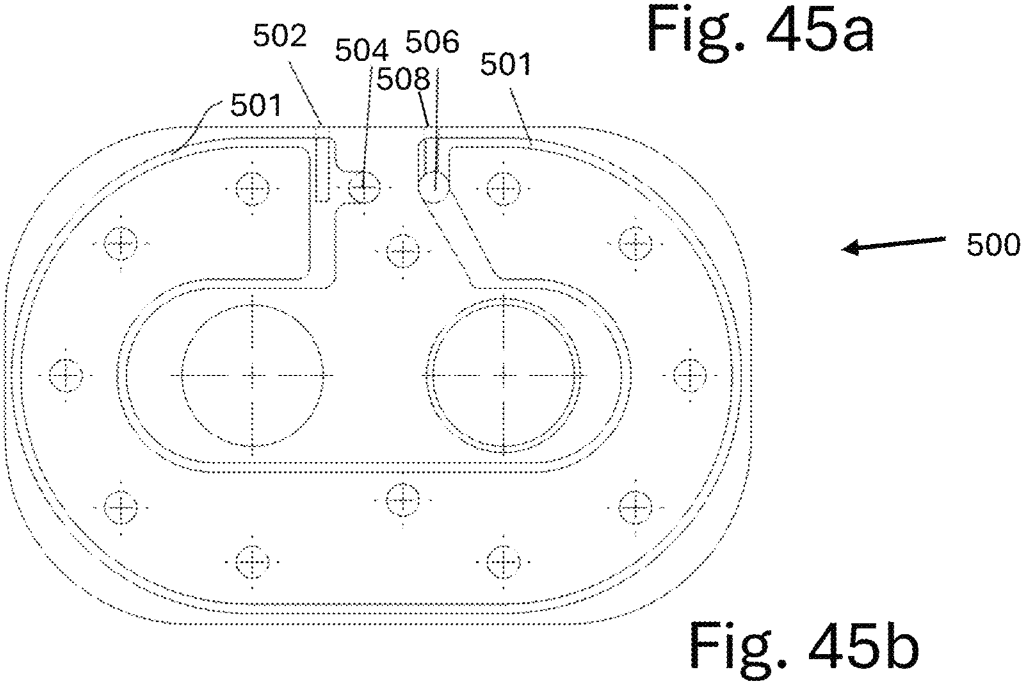

FIG. 45*a* illustrates examples of an upper panel (or lower panel, or an end panel) formed by subpanel layers, wherein the middle subpanel 500 has grooves for the introduction and circulation of a lubricant and/or coolant, according to some embodiments of the present invention. FIG. 45*b* illustrates the middle subpanel 500 of the panel of FIG. 45*a*.

In some embodiments of the present invention, at least one of the upper panel and the lower panel includes grooves for receiving a lubricant or a coolant, circulating the lubricant or the coolant along the at least one of the upper panel and the lower panel, and for discharging the lubricant or the coolant.

The panel may include: a channel groove 501, a first internal port 504 which allows fluid passage to other intermediate subpanels adjacent to the subpanel 500, a second internal port 506 which allows fluid passage to other intermediate subpanels adjacent to the sublayer 500, and an input or return channel groove 508. Optionally, an input side port 502 and/or an output side port 508 are present as well.

The coolant or lubricant is received from a reservoir of lubricant or coolant, either directly though the input side port 502 or from an adjacent subpanel via the first internal port 504 (which is near the input side port 502). The coolant or lubricant circulates in the channel groove 501 and leaves the subpanel 500 either via the output side port 508 or into an adjacent subpanel via the second internal side port 508.

If a coolant is used, at least one cover subpanel (510, 512) covers the circulation subpanel 500 (or covers a plurality of stacked circulation subpanels 500), to close the groove and the internal ports to prevent leakage of the coolant. In some embodiments of the present invention, two cover subpanels 510 and 512 sandwich the circulation subpanel 500 (or a plurality of stacked circulation subpanels 500) from both sides. If a lubricant is used, the cover subpanels are not needed, as a wick (not shown) is included to cover the channel groove and absorb the lubricant to the channel groove to contact the moving parts (discs, gears).

FIG. 64-68 show an example of a lower panel 112 configured for lubrication of a moving part, according to some embodiments of the present invention. FIGS. 64-68 exemplify a lower panel 112, but an upper panel 114 or an end panel may be configured in the same manner.

The lower panel 112 includes a channel 702 extending inside the lower panel and having an opening 704 at the side of the lower panel. The lower panel also includes a groove on 706 carved on the surface that faces the moving parts. If both surfaces contact moving parts, grooves may be present on both surfaces. The groove 706 intersects the channel 702 and is in fluid communication with the channel 702. A wick 708 is shaped to match the groove's shape and be inserted into the groove 706 and extend slightly out of the groove 706. The wick may be made of complaint material (such as cloth, sponge, etc.). As the moving parts are joined to the lower panel 112, the moving parts contact the wick 708. The wick absorbs the lubricant from the channel 702, such that the lubricant is distributed across the wick 708, and delivers the lubricants to the moving parts by contact with the moving parts. As the moving parts rotate, the lubricant is moved around to lubricate the surface of the moving parts the contact the lower panel 112, for smoother rotation. The wick prevents free flow of the lubricant out of the groove, while still enabling delivery of the lubricant to the surfaces of the moving parts that contact the lower panel.

In some embodiments of the present invention, the groove 706 extends between the centers of the openings 154 and 156. In this manner, the groove extends between in the zero-rotation configuration of the power disc and the gate cam disc. This ensures that the moment beam by passing over the groove during the rotation of the moment beam is also lubricated.

Individual energy conversion units in the effort machine may be configured as pumps. Tubing or manifolds are added to these pumps to deliver lubricant or coolant to dedicated lubricant or coolant panels of FIGS. 45*a*-45*b* and 64-68.

Figure 46:
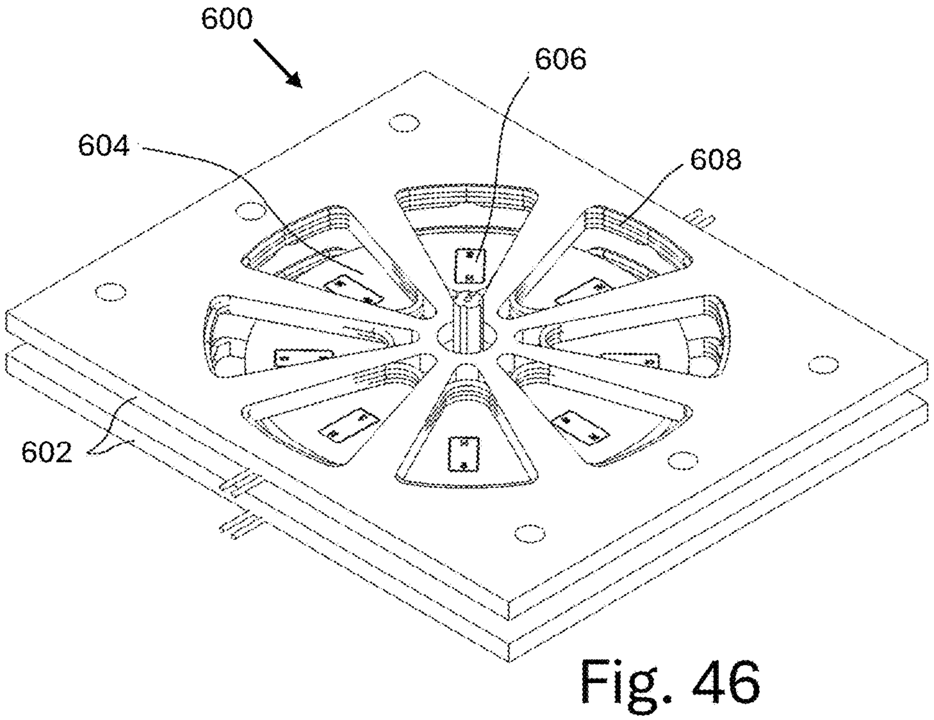
FIG. 46 illustrates a magnetic rotor joinable to one of the shafts of the effort machine of the present invention, for potentially operating as an electric motor and/or electric power generator, according to some embodiments of the present invention.
Figure 47:
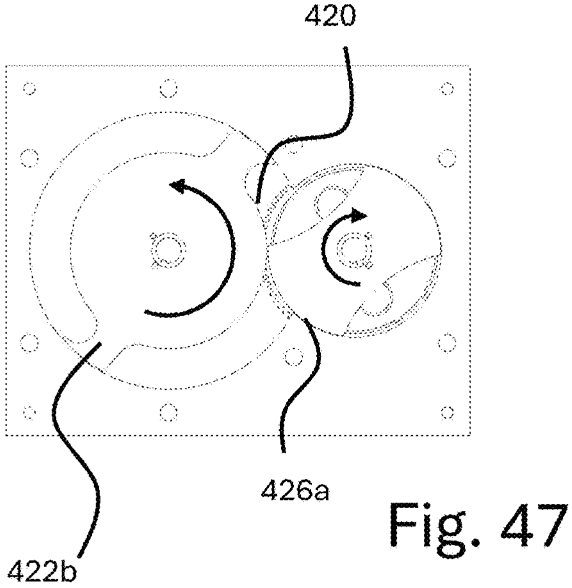
FIGS. 47-53 illustrate a progression of successive stages in the timed rotation of the power disc and of the gate cam disc of the energy conversion of FIG. 40, according to some embodiments of the present invention.
Figure 48:
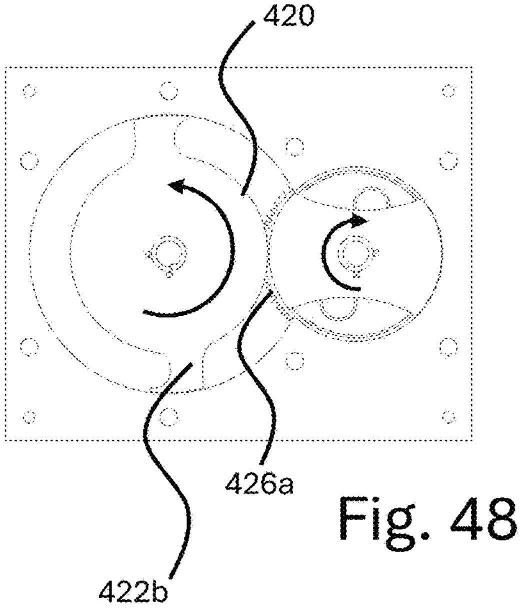
Figure 49:
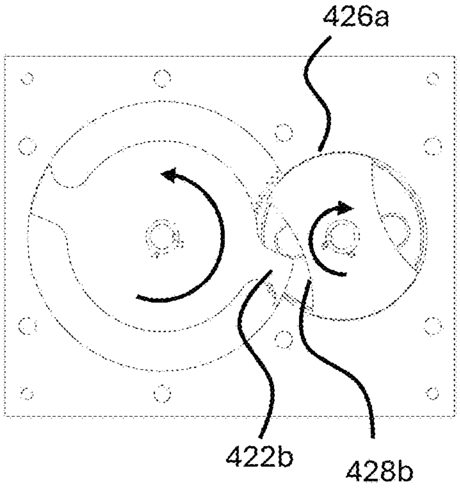
Figure 50:
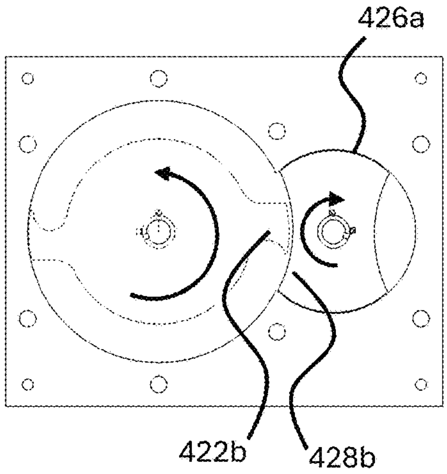

FIG. 46 illustrates a magnetic rotor joinable to any one of the shafts of the effort machine of the present invention, for generating electric power or to act as an electric motor according to some embodiments of the present invention.

The effort machine may include a magnetic rotor having a rotating element joined to the first shaft and/or the second shaft.

The magnetic rotor includes stationary wire coils 608 held inside stationary holders 602, a rotating element 604 between the holders, with magnets 606 disposed in the rotating element.

The rotating element 604 is joined to any one of the shafts to rotate with the shaft. It is conceivable to have at least one magnetic rotor joined each of the shafts.

Rotation of the rotating element causes generation of electric current in the stationary coil wires 608. Electric circuitry, such as bridge rectifiers can convert and couple all the coils as a complete electrical circuit. When the rectifiers are connected, direct current (DC) is generated. Alternating current (AC) is generated without rectifiers. Conversely, electrical current flowing through the coils causes rotation of the rotating element.

The magnetic rotor 600 can be configured as an electric power generator, which generates electricity (AC or DC power) due to the rotation of the shaft. The magnetic rotor 600 can also be configured as an electric motor which rotates the shaft and enables the effort machine to be used as a pump. This occurs when electrical current flows through the coils 608 causing the rotating element 604 to rotate due to the interaction with the magnetic field induced by current through the coils and the magnets 606 on the rotating element 604.

In view of the above description, it can be clearly seen that the effort machine of the present invention can be used as a mechanical solution of locomotion, energy generation and, or mechanical effort. The use of two or three sets of moving parts (each set comprising one or more discs, a shaft, and optionally a gear rotating coaxially) and a one directional motion (rotation in the same direction) are departures from the prior art, which necessitates many moving parts and loses efficiency due to a plurality of direction changes.

Moreover, a plurality of energy conversion units may be stacked in a single effort machine, enabling the simple assembly of effort machines serving any one purpose (e.g., motor, generator, engine, pump), or serving a plurality of purposes at the same time. The simple assembly of the effort machine allows for a high level of customization of the effort machine for a plurality of objectives.

The effort machine may be powered by a plurality of sources: for example internal combustion using numerous variant fuels, steam powered, hydraulic powered, pneumatic power, conventional fossil fuels, alcohols, Split $H_2O_2 \rightarrow H_2 + O_2$ ignition and combustion and others. There is no limitations to the types of fuels that can be efficiently used in the effort machine of the present invention.

Potentially fueled by split $H_2O_2$ by means of electrolysis, the effort machine of the present invention can offer a preferred engine of means to power almost any needed form of transport or locomotion. Including liquid or vapor pumps, automobiles, trucks, heavy equipment, marine vessels, submarines, drones, machinery, including flying aircraft of unlimited scale.

Moreover, the effort machine of the present invention can be built into a very light weight and very efficient mechanical power source: a formidable improved mechanical engine motor.

The same effort machine of the present invention, can also power mechanical shaft powered effort as in automobiles, motorcycles, air planes, water vessels, drones, airplanes, human flying transport vehicles, marine vessels, submarines, pumps, electric power generation, pneumatic and hydraulic pumps and others.

The effort machine of the present invention may be made of modern materials, such as carbon fiber, metals, plastics.

Fabrication of the parts of the effort machine is easy, as most parts have simple, easy to fabricate shapes (largely two dimensional shaped panels, discs, plates), as required to comprise laminated plates and disks.

Figure 63:
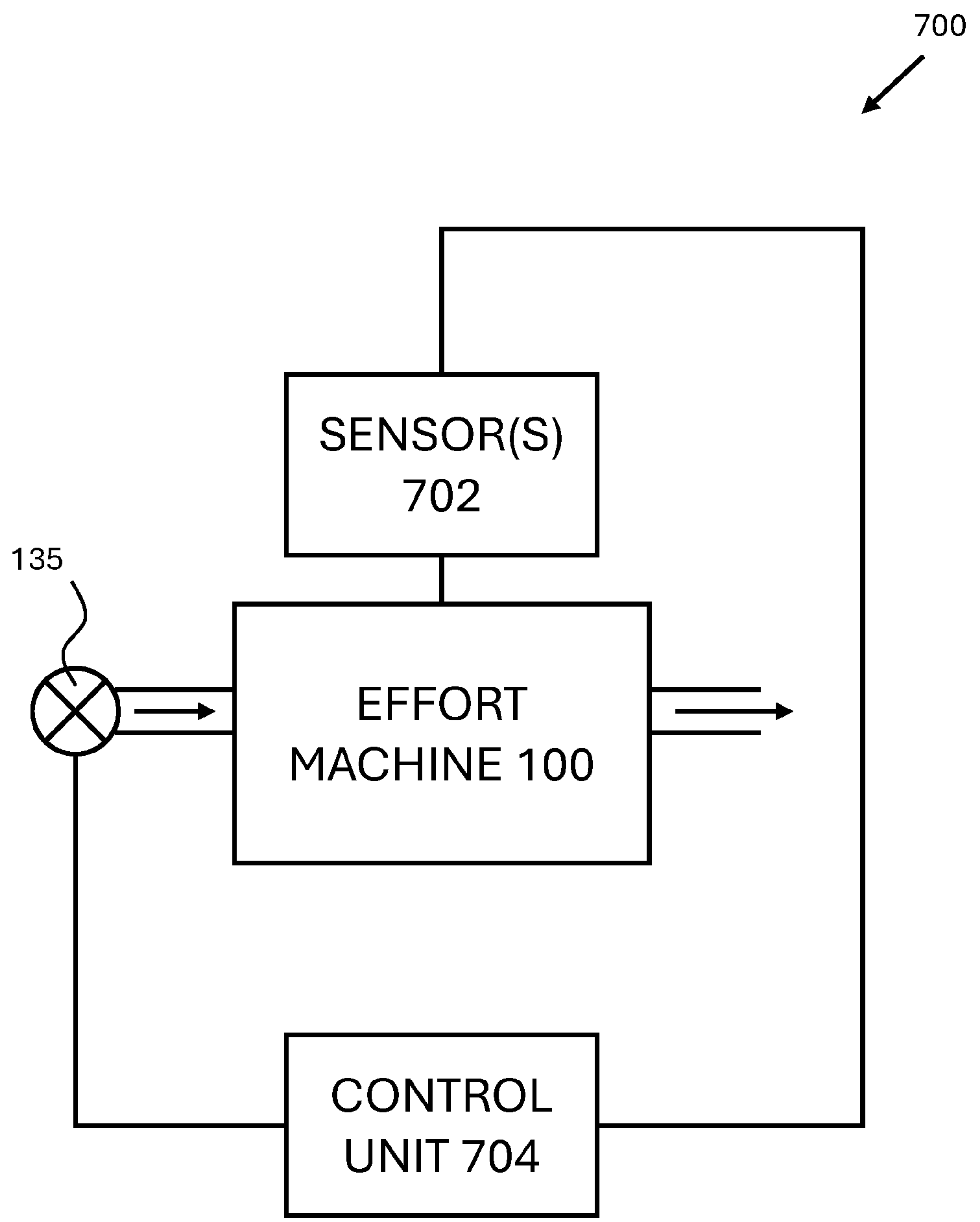
FIG. 63 illustrates an example of a system which includes the effort machine of the present invention.
Figure 64:
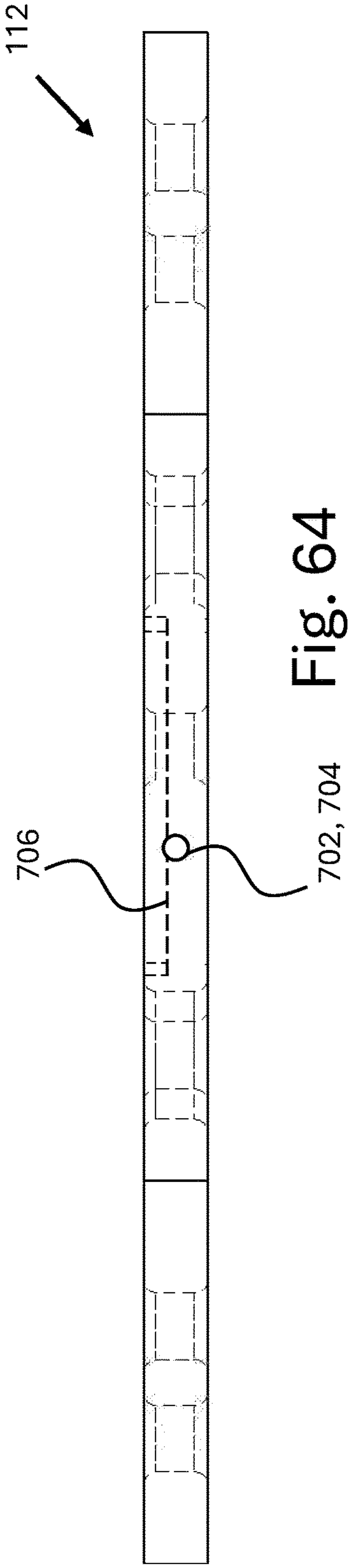
FIGS. 64-68 show an example of a lower panel configured for lubrication of a moving part, according to some embodiments of the present invention.
Figure 66:
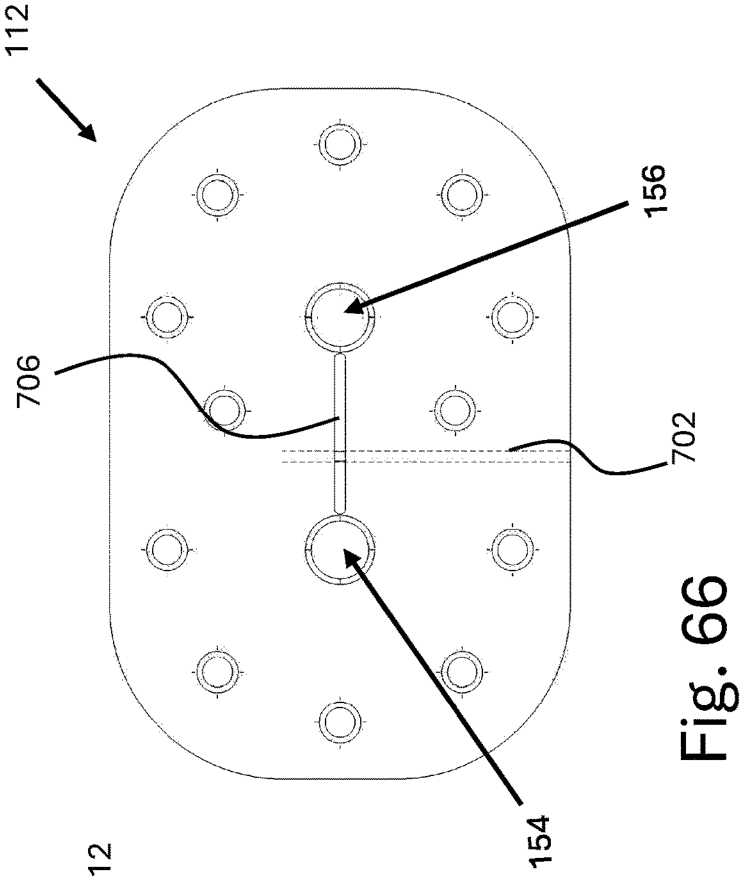
Figure 65:
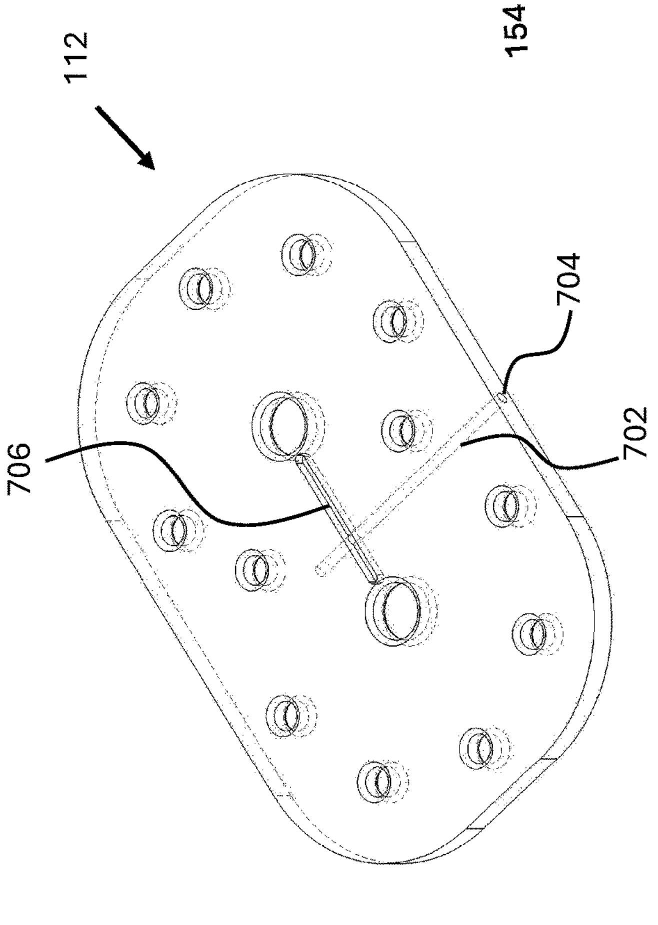
Figure 67:
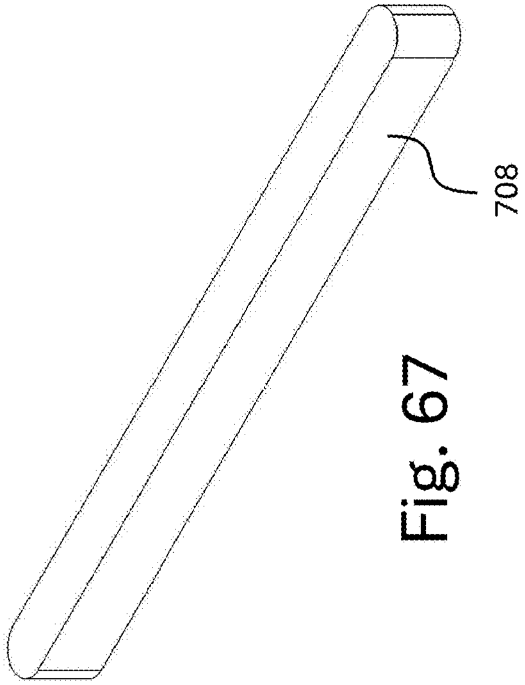
Figure 68:
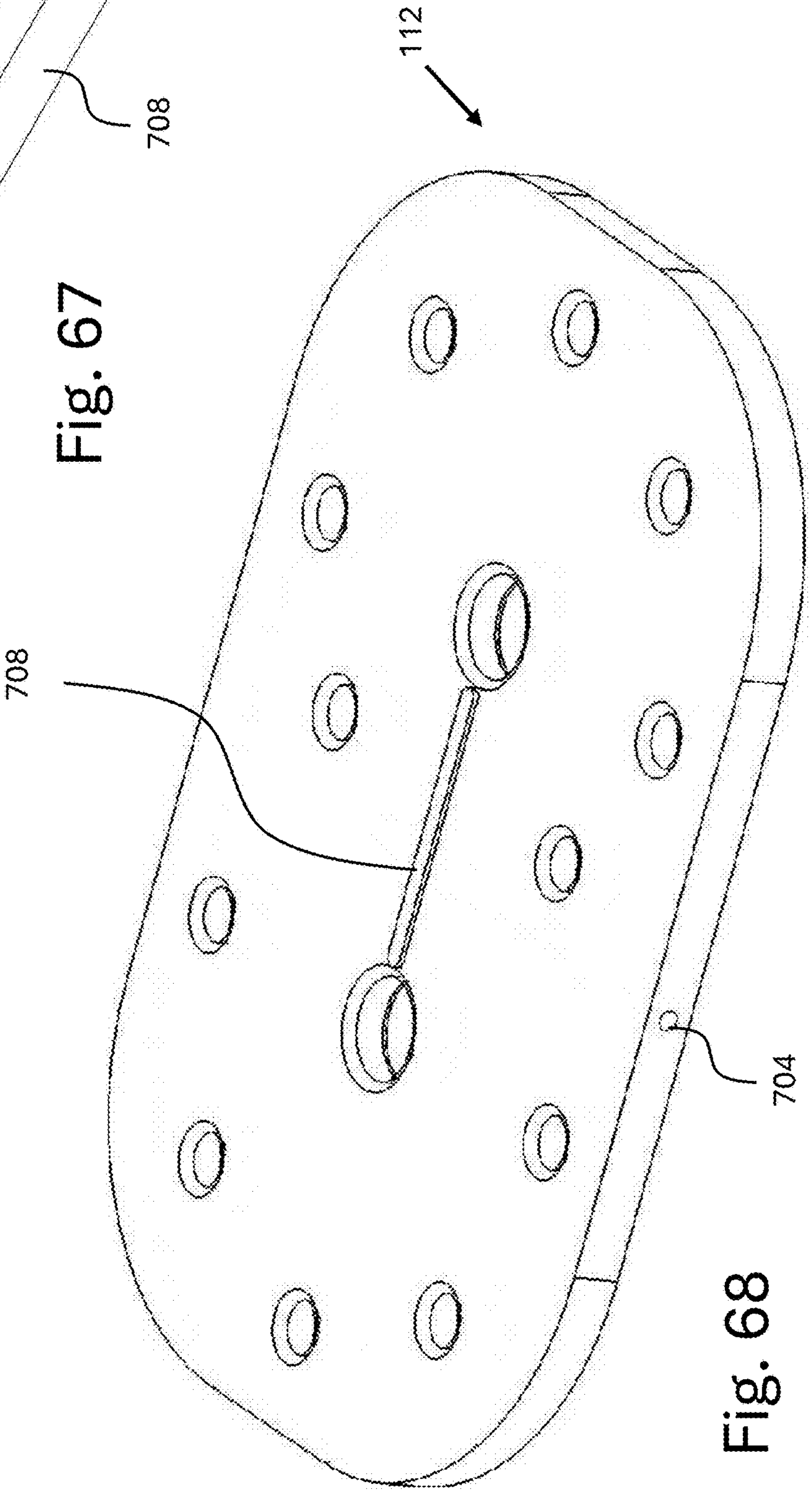

FIG. 63 illustrates an example of a system 700 which includes the effort machine 100 of the present invention.

The system 700 is configured for controlling the operation of the effort machine 100. The system 700 includes the effort machine 100, one or more valves 135, one or more sensors 702, and a control unit 704.

The valve(s) control(s) entry for fluids (liquid and/or gas) into the effort machine, as explained above. The sensor(s) 702 measure(s) the rotation and positions of the power disc and gate cam disc of the effort machine 100, as described above. Data collected by the sensor(s) 702 is sent in real time to the control unit 704. The control unit 704 processes the sensor data and opens and closes the one or more valves 135 in response to the sensor data, according to predetermined machine instructions stored in a memory utility of the control unit and executed by a processing utility of the control unit. In this manner, the operation of the effort machine 100 is optimized for higher efficiency.

The control unit may be configured to identify undesirable conditions and stop the operation of the effort machine and/or generate a warning indicative of the undesirable conditions. The undesirable conditions may include: rotation speed of the power disc and gate cam disc outside a predetermined range (e.g., too slow or too fast), misalignment of the power disc and gate cam disc (more specifically, misalignment of the indentation and moment beam).

What is claimed is:

1. An effort machine, comprising:

i. a first shaft;

ii. a second shaft;

iii. a power disc joined to the first shaft to rotate with the first shaft, the power disc having a first circumference and a moment beam extending radially from a portion of the first circumference;

iv. a gate disc joined to the second shaft to rotate with the second shaft, the gate disc having a perimeter that comprises a partial circumference and an indentation, the partial circumference extending from a first edge to a second edge and the indentation extending inward between the first edge and the second edge opposite the partial circumference;

v. a timing apparatus coupled to the first shaft and to the second shaft and configured to control a rotation of the gate disc and the power disc, such that at a first rotational range the first circumference contacts the partial circumference, and at a second rotational range the moment beam is contained within the indentation;

vi. a compression plate, having an inlet, an outlet, and a cavity, the cavity being configured for holding the power disc and the gate disc, the cavity being bounded by:

a first curved wall centered about the first shaft and having a first end and a second end; and a second curved wall centered about the second shaft and meeting the first curved wall at the first end of the first curved wall and at the second end of the first curved wall;

vii. a lower panel below the compression plate and configured to close the cavity from below;

viii. an upper panel above the compression plate and configured to close the cavity from above;

wherein the first curved wall is configured such that the moment beam is flush with the first curved wall in the first rotational range, wherein the lower panel is flush with bottom surfaces of the power disc and the gate disk, and wherein the upper panel is flush with top surfaces of the power disc and the gate disk;

wherein the inlet opens into the cavity at a first position on the first curved wall for guiding a fluid from outside the compression plate into the cavity;

wherein the outlet opens into the cavity at a second position on the first curved wall for guiding the fluid from the cavity outside the compression plate.

2. The effort machine of claim 1, wherein the first position is on the first wall, in a vicinity of the first end of the first curved wall, while the second position is on the first wall, in a vicinity of the second end of the first curved wall.

3. The effort machine of claim 1, wherein the timing apparatus comprises:

a first gear joined to the first shaft to rotate with the first shaft; and a second gear meshed with the first gear, the second gear being joined to the second shaft to rotate with the second shaft;

wherein the first gear and the second gear are located outside the compression plate, beyond the lower panel or beyond the upper panel.

4. The effort machine of claim 1, wherein:

the lower panel has a first opening configured to be traversed by the first shaft and a second opening configured to be traversed by the second shaft, the effort machine comprises a first bearing and a second bearing covering the first opening and the second opening, respectively, the first bearing being configured to couple to the first shaft and the second bearing being configured to couple to the second shaft, to enable rotation of the first shaft and the second shaft while preventing flow of the fluid out of the cavity of the compression plate via the lower panel; and/or the upper panel has a third opening configured to be traversed by the first shaft and a fourth opening configured to be traversed by the second shaft, while the effort machine comprises a third bearing and a fourth bearing covering the third opening and the fourth opening, respectively, the third bearing being configured to couple to the first shaft and the fourth bearing being configured to couple to second shaft, to enable rotation of the first shaft and the second shaft while preventing flow of the fluid out of the cavity of the compression plate via the upper panel.

5. The effort machine of claim 1, wherein:

the fluid entering the cavity via the inlet comprises a flammable fluid;

the compression plate comprises an ignition port located on the first curved wall in a vicinity of the inlet, the ignition port comprising an ignition device configured to ignite the flammable fluid located between the moment beam of the power disc and the partial circumference of the gate disc in the first rotational range, once the inlet and the ignition port are cleared by the moment beam.

6. The effort machine of claim 1, comprising a one-way valve at the inlet to prevent flow of the fluid out of the cavity via the inlet.

7. The effort machine of claim 1, wherein the compression plate is a first compression plate and the effort machine comprises at least one second compression plate having a second cavity containing a second power disc and a second gate disk, wherein:

the second compression plate is stackable onto the first compression plate on top of the upper panel, such that the second power disc is joined to the first shaft to rotate with the first shaft and the second gate disc is joined to the second shaft to rotate with the second shaft;

the second cavity is bounded by:

a third curved wall centered about the first shaft and having a third end and a fourth end; and a fourth curved wall centered about the second shaft and meeting the third curved wall at the third end and at the fourth end;

the second power disc has a second circumference and a second moment beam extending radially from a portion of the second circumference;

the second gate disc has a second perimeter that comprises a second partial circumference and a second indentation, the second partial circumference extending from a third edge to a fourth edge and the second indentation extending inward between the third edge and the fourth edge opposite the second partial circumference;

at a third rotational range the second circumference of the second power disc contacts the second partial circumference of the second gate disc, and at a fourth rotational range the second moment beam is contained within the second indentation.

8. The effort machine of claim 7, wherein the third rotational range corresponds to the first rotational range, while the fourth rotational range corresponds the second rotational range.

9. The effort machine of claim 7, wherein the third rotational range is offset with respect to the first rotational range, while the fourth rotational range is offset with respect to the second rotational range.

10. The effort machine of claim 7, wherein the second compression plate has:

a second inlet which opens into the second cavity at a third position on the third curved wall for guiding the fluid from outside the second compression plate into the second cavity;

a second outlet which opens into the second cavity at a fourth position on the third curved wall for guiding the fluid from the second cavity outside the compression plate.

11. The effort machine of claim 7, wherein:

the second compression plate has a second inlet which opens into the second cavity at a third position on the third curved wall for guiding the fluid from outside the second compression plate into the second cavity;

the upper panel between the first compression plate and the second compression plate has a channel having a first end opening under the second power disc and a second end opening above the cavity of the first compression plate;

the second power disc has a notch located on the bottom of the second power disc, downstream of the second moment arm, and conforming to the first end of the channel, such that when the notch aligns with the first end of the channel, compressed fluid flows into the channel from the second cavity of the second compression plate to the cavity of the first compression plate.

12. The effort machine of claim 11, wherein the second end of the channel opens in a vicinity of the first end of the first wall.

13. The effort machine of claim 1, further comprising:

a third shaft;

a second power disc joined to the third shaft to rotate with the third shaft, the second power disc having a second circumference and a second moment beam extending radially from a portion of the second circumference;

wherein the compression plate comprises a third curved wall centered about the third shaft and having a third end and a fourth end, the third curved wall meeting the second curved wall at the third end and the fourth end, such that the cavity is bounded by the first wall, the second wall, and the fourth wall;

wherein the timing apparatus is coupled to the first shaft, the second shaft, and the third shaft, such that:

the first rotational range comprises a first subrange, a second subrange, and a third subrange;

in the first subrange of the first rotational range, the first circumference of the first power disc contacts the partial circumference of the gate disc, while the second circumference of the second power disc contacts the partial circumference of the gate disc;

in the second subrange of the first rotational range, the second moment beam of the second power disc is contained within the indentation of the gate disc;

in the third subrange of the first rotational range, the first circumference of the first power disc contacts the partial circumference of the gate disc, while the second circumference of the second power disc contacts the partial circumference of the gate disc;

in the second rotational range, the first moment beam of the first power disc is contained within the indentation of the gate disc.

14. The effort machine of claim 13, wherein the timing apparatus comprises:

a first gear joined to the first shaft to rotate with the first shaft;

a second gear meshed with the first gear, the second gear being joined to the second shaft to rotate with the second shaft; and a third gear meshed with the second gear, the third gear being joined to the third shaft to rotate with the third shaft;

wherein the first gear, the second gear, and the third gear are located outside the compression plate, beyond the lower panel or beyond the upper panel.

15. The effort machine of claim 1, comprising a magnetic rotor which comprises:

an electrical coil;

a rotating element having magnets disposed thereupon, the rotating element being joined to at least one of the first shaft and the second shaft to rotate coaxially with the at least one of the first shaft and the second shaft.

16. The effort machine of claim 15, wherein the magnetic rotor is configured to be used as a generator, by converting rotation of the at least one of the first shaft and the second shaft into rotation of the rotating element, and into electrical current passing through the coils due to rotation of the magnets in the rotating element.

17. The effort machine of claim 15, wherein the magnetic rotor is configured to be used as a motor, by converting electrical current passing through the coils into rotation of the rotating element, and to rotation of the at least one of the first shaft and the second shaft joined to the rotating element.

18. The effort machine of claim 1, wherein at least one of the upper panel and the lower panel comprise:

a circulation subpanel comprising an input port for receiving a lubricant or a coolant, a groove for circulating the lubricant or the coolant along the circulation subpanel, and an output port for discharging the lubricant or the coolant; and at least one cover subpanel to close the groove.

19. The effort machine of claim 1, comprising a detection system configured to detect a position of the moment beam and of the indentation.

20. An effort machine, comprising:

i. a first shaft;

ii. a second shaft;

iii. a power disc joined to the first shaft to rotate with the first shaft, the power disc having a first circumference, a first moment beam extending radially from a first portion of the first circumference, and a second moment beam extending radially from a second portion of the first circumference opposite to the first portion;

iv. a gate disc joined to the second shaft to rotate with the second shaft, the gate disc having a perimeter that comprises a first partial circumference, a first indentation, a second partial circumference, and a second indentation, such that each of the first partial circumferences and the second partial circumference is adjacent to the first indentation and the second indentation, while being opposite to each other;

v. a timing apparatus coupled to the first shaft and to the second shaft and configured to control a rotation of the gate disc and the power disc, such that:

at a first rotational range, the first moment beam is contained in the first indentation;

at a second rotational range, the first circumference contacts the first partial circumference;

at a third rotational range, the second moment beam is contained in the second indentation;

at fourth rotational range, the first circumference contacts the second partial circumference;

vi. a compression plate, having an inlet, an outlet, and a cavity, the cavity being configured for holding the power disc and the gate disc, the cavity being bounded by:

a first curved wall centered about the first shaft and having a first end and a second end; and a second curved wall centered about the second shaft and meeting the first curved wall at the first end of the first curved wall and at the second end of the first curved wall;

vii. a lower panel below the compression plate and configured to close the cavity from below;

viii. an upper panel above the compression plate and configured to close the cavity from above;

wherein the first curved wall is configured such that the first moment beam and the second moment beam are flush with the first curved wall when not in respective ones of the first indentation and the second indentation, wherein the lower panel is flush with bottom surfaces of the power disc and the gate disk, and wherein the upper panel is flush with top surfaces of the power disc and the gate disk;

wherein the inlet opens into the cavity at a first position on the first curved wall for guiding a fluid from outside the compression plate into the cavity;

wherein the outlet opens into the cavity at a second position on the first curved wall for guiding the fluid from the cavity outside the compression plate.

* * * * *